United States Patent [19]

Ichikawa et al.

[11] Patent Number: 5,583,755
[45] Date of Patent: Dec. 10, 1996

[54] CONTROL SYSTEM HAVING INDEPENDENT AND COOPERATIVE CONTROL FUNCTION

[75] Inventors: Yoshiaki Ichikawa, Hitachioota; Yoshikazu Ishii; Haruo Kibushi, both of Hitachi, all of Japan

[73] Assignee: Hitachi, Ltd., Tokyo, Japan

[21] Appl. No.: 243,299

[22] Filed: May 17, 1994

[30] Foreign Application Priority Data

May 18, 1993 [JP] Japan .................................. 5-115578

[51] Int. Cl.$^6$ ............................................. G05B 13/02
[52] U.S. Cl. .................. 364/157; 364/187; 364/180; 364/131
[58] Field of Search ...................... 364/148, 150, 364/152, 157, 162, 172, 173, 175, 184, 551.01, 571.01, 182, 187, 131, 137, 180; 376/207, 210, 211; 315/149, 152–155; 381/371; 236/35, 66, 91 D; 62/166, 168, 218

[56] References Cited

U.S. PATENT DOCUMENTS

| | | | |
|---|---|---|---|
| 4,008,829 | 2/1977 | Chandra et al. | 364/173 X |
| 4,138,725 | 2/1979 | Ikemoto et al. | 364/173 X |
| 4,143,415 | 3/1979 | Klingbeil | 364/137 |
| 4,616,308 | 10/1986 | Morshedi et al. | 364/172 X |
| 4,997,617 | 3/1991 | Newton et al. | 364/148 X |
| 5,023,808 | 6/1991 | Seraji | 364/163 |
| 5,027,267 | 6/1991 | Pitts et al. | 364/172 |
| 5,191,521 | 3/1993 | Brosilow | 364/172 X |
| 5,195,027 | 3/1993 | Breckner | 364/182 X |
| 5,260,865 | 11/1993 | Beauford et al. | 364/151 |

FOREIGN PATENT DOCUMENTS

| | | |
|---|---|---|
| 63-235898 | 9/1988 | Japan . |
| 1-240897 | 9/1989 | Japan . |

*Primary Examiner*—Roy N. Envall, Jr.
*Assistant Examiner*—Brian C. Oakes
*Attorney, Agent, or Firm*—Fay, Sharpe, Beall, Fagan, Minnich & McKee

[57] ABSTRACT

A control system comprising two controller modules. The controller module includes an independent controller, a cooperative controller, an adjuster and a synthesizer. The independent controller inputs measured values xi of a system variable from a target system controlled by the current module. The cooperative controller inputs measured values of a control variable xj from a target system controlled by another module. The adjuster adjusts the gain of the cooperative controller 4 based on the control variable xi. The synthesizer corrects the output of the independent controller 3 by using that of the cooperative controller and effects on output reflecting the composition. The target system being controlled by the current module is controlled according to the output of the synthesizer of the current module. Any interference that may occur between the changing system variables of the target system can be suppressed in a short time.

45 Claims, 26 Drawing Sheets

CONTROL RESULT OF PRIOR ART
(INDEPENDENT CONTROL)

CONTROL RESULT OF PRESENT EMBODIMENT

CONTROL SYSTEM HAVING INDEPENDENT AND COOPERATIVE CONTROL FUNCTION

BACKGROUND OF THE INVENTION

The present invention relates to a control system having independent and cooperative control functions.

There exist control systems each controlling a variety of target systems. Where such target systems interact with one another, the system variables of these target systems can interfere with one another. That is, when a given target system is controlled and its system variable is increased or decreased accordingly, the system variable of another target system can be varied under the influence of the other system variable being controlled.

The above aspect of the multivariable control scheme is described illustratively in Japanese Patent Laid-Open No. 235898/1988 (from line 16 in the left-hand column through line 1 in the right-hand column, in the upper part of page 3).

The disclosure in Japanese Patent Laid-Open No. 235898/1988 involves having a plurality of independent controllers controlled by multivariable cooperative controllers. The cited examples of the independent controllers include a recirculation flow rate controller and a pressure controller. FIG. 5 of Japanese Patent Laid-Open No. 240897/1989 shows a plurality of local controllers (i.e., independent controllers) being controlled by multivariable cooperative controllers.

FIG. 4 of Japanese Patent Laid-Open No. 240897/1989 describes a setup involving two independent controllers and two cooperative controllers. In this setup, one cooperative controller outputting a signal to be added to a reference value u, of one independent controller inputs the output of the other independent controller; the other cooperative controller inputs the output of one independent controller and outputs a signal to be added to the reference value of the other independent controller.

The above and other similar conventional control systems have a problem. For example, if a cooperative controller fails, the failure affects the two independent controllers in their control operations. As a result, the control response of any of the target systems under control can deteriorate.

This holds true of what is disclosed in Japanese Patent Laid-Open No. 235898/1988 and in FIG. 5 of Japanese Patent Laid-Open No. 240897/1989. In these cases, a failure in a multivariable cooperative controller will likely affect the two independent controllers that receive the output of the failed cooperative controller.

In the setup of FIG. 4 in Japanese Patent Laid-Open No. 240897/1989, one failed cooperative controller will likely affect one of the independent controllers receiving the output of the failed unit, the other cooperative controller that receives the output of the independent controller receiving the output of the failed unit, and the other independent controller that receives the output of the other cooperative controller. In this manner, one failed cooperative controller can degrade the control response of a plurality of target systems under control.

SUMMARY OF THE INVENTION

It is an object of the present invention to provide a control system having independent and cooperative control functions and being capable of quickly actuating cooperative control so as to suppress in a short time the interference of system variables between the target systems.

The above object may be achieved according to one aspect of the present invention, which provides a control system having independent and cooperative control functions comprising a plurality of control modules, each of the controller modules including a independent controller for outputting a first control signal based on the measured values of the first system variable from the first target system controlled by the current controller module, a cooperative controller for outputting the second control signal based on the measured values of the second system variable from a second target system controlled by another controller module, and a control signal generation apparatus outputting third control signals for controlling the first target system based on the first and the second signals.

With each controller module, the cooperative controller inputs the measured values of the second system variable, and outputs the third control signals for controlling the first target system based on the first and the second control signal. This allows cooperative control to be effected quickly, whereby any interference that may occur between the changing system variables of target systems can be suppressed in a short time.

DETAILED DESCRIPTION OF THE PREFERRED EMBODIMENTS

Figure 1:
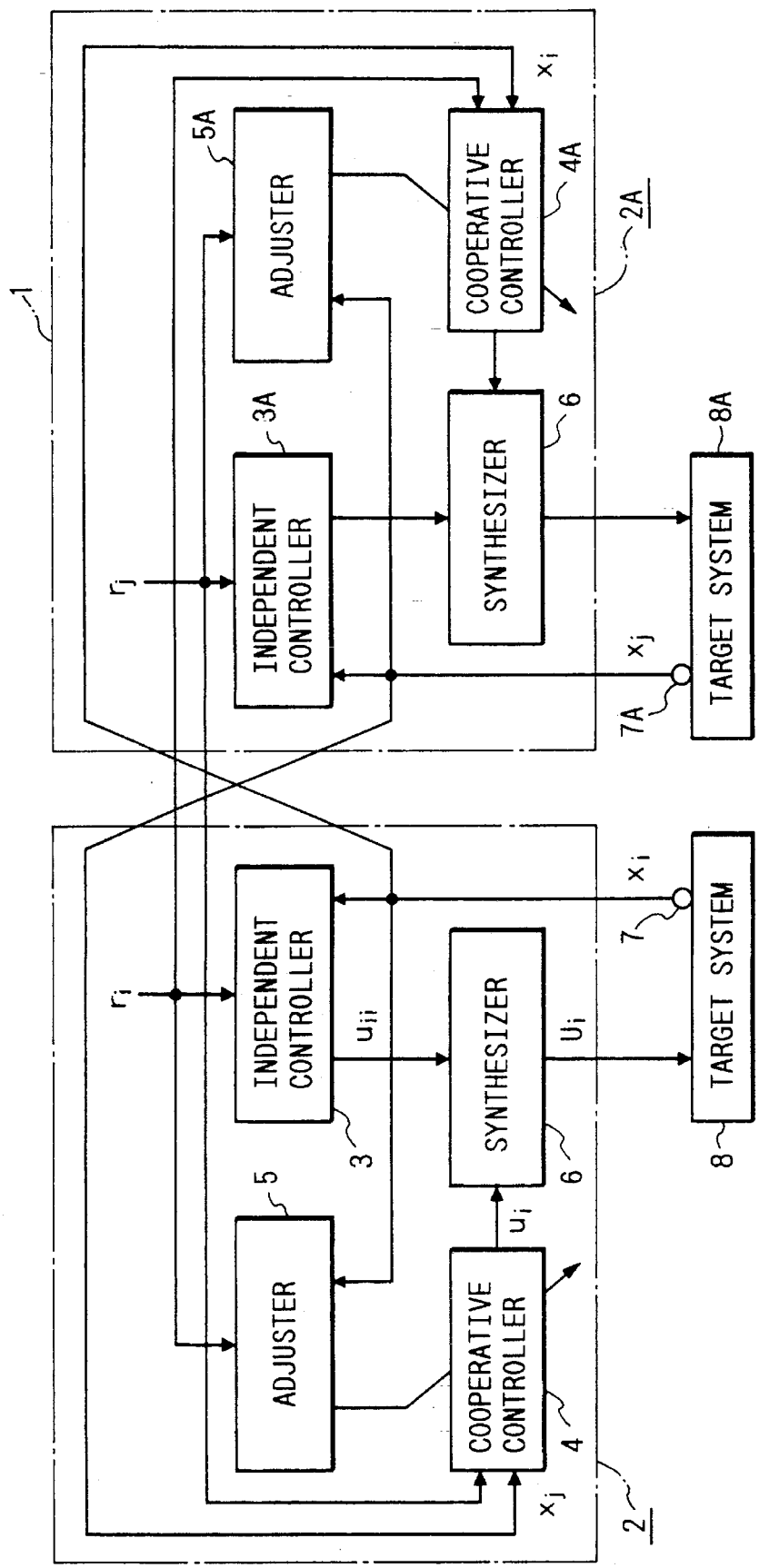
FIG. 1 is a block diagram of a control system embodying the present invention.

What follows is a description of how the invention is embodied illustratively in a variety of control systems each having independent and cooperative control functions (each system simply called the control system hereunder).

One control system of the present embodiment has a plurality of controller modules. Illustratively, this embodiment may have two controller modules for the sake of simplicity. The present embodiment is explained below with reference to FIG. 1. The control system 1 of FIG. 1 comprises controller modules 2 and 2A. The controller module 2 includes a independent controller 3, a cooperative controller 4, an adjuster 5 and a synthesizer 6. The controller module 2A has a independent controller 3A, a cooperative controller 4A, an adjuster 5A and a synthesizer 6.

The control modules 2 and 2A control separate target systems, i.e., the module 2 controlling target system 8 and the module controlling target system 8A. With this embodiment, the target systems 8 and 8B under control are of the same kind yet they are separately controlled. A system variable $x_i$ (e.g., flow rate of fluid) acquired as a result of controlling the target system 8 is detected by a sensor 7 and input to the controller module 2; a system variable $x_j$ (e.g., temperature of fluid at a different location) obtained from controlling the target system 8A is detected by a sensor 7B and input to the controller module 2A. The system variables $x_i$ and $x_j$ are usually vector quantities. The embodiment of FIG. 1 may also be applied to cases where the target systems 8 and 8B to be controlled are of different kinds.

The controller module 2 is structured as follows. The independent controller 3 inputs values of the system variable $x_i$ measured by the sensor 7 (i.e., the measured values of system variable $x_i$) and outputs a independent control signal $u_{ii}$ accordingly. The measured values of the system variable $x_j$ are taken by the current module, which is the controller module 2 when viewed from the controller module 2; the controller module 2A is another module as opposed to the current module. The independent controller 3 calculates the function of equation (1) below, and outputs a independent control signal $u_{ii}$ accordingly. Although equation (1) apparently does not show a reference value $r_i$, the equation actually includes the value (see equation (4) and (5), to be described later). The suffixes i and j are integers of which the maximum value is the number of the controller modules configured equation (1) is given as:

$$u_{ii} = f_{ii}(x_i) \qquad (1)$$

where, the function $f_{ii}(x_i)$ represents a independent control rule. For example, if the independent controller 3 provides PID control, the independent control rule is given by equation (2):

$$f_{ij}(x_i) = K1 \cdot x_i + K2 \cdot s \cdot x_i + K3 \cdot 1/s \cdot x_i \qquad (2)$$

where, K1 is a proportional gain, K2 is a differential gain, K3 is an integral gain, and s is a Laplace operator.

The cooperative controller 4 inputs values of the system variable $x_j$ (measured by a sensor 7A) from the another module (controller module 2A) and a reference value $r_j$ of the same system variable $x_j$, and outputs a cooperative control signal ui acquired by computing the cooperative control rule $u_{ij}$ based on equation (3) below. The reference value $r_j$ is input to the independent controller 3A in the controller module 1A.

$$u_{ij} = \sum_j f_{ij}(x)_j \qquad (3)$$

where, $f_{ij}$ is a function expressing the cooperative control rule and is defined for every system variable $x_j$. If a plurality of other modules exist (i.e., if three or more controller modules are configured), the cooperative controller 4 obtains the cooperative control signal ui by getting the sum of $f_{ij}(x_j)$ for each of the multiple system variables $x_j$ from the other modules.

The synthesizer 6 adds the cooperative control signal ui to the independent control signal uii in a contribution ratio that varies with the situation, and outputs a control signal Ui that is the output of the controller module 2. To acquire the control signal $U_i$, the synthesizer 6 could simply add up or take a weighted sum of what it inputs. However, there are cases in which the change in the system variable $x_j$ stemming from the controller module 2A controlling the target system 8A affects significantly the system variable $x_i$ of the target system 8 under control of the controller module 2 which is the current module. In such cases, the synthesizer 6 may effectively combine the independent control signal $u_{ii}$ with the cooperative control signal ui in a manner that increases the proportion of the cooperative control signal $u_i$.

Given the control variable $x_i$, the adjuster 5 adjusts the cooperative controller 4 to leave unaffected the system variable $x_i$ of the controlled target system 8 by canceling the effect of the changes in the system variable $x_j$ of the target system 8A under control of the another module. With its gain thus adjusted, the cooperative controller 4 outputs a cooperative control signal that cancels the adverse effect from the another module on the target system controlled by the current module. Specifically, the adjuster 5 adjusts the gain of the cooperative controller 4. How the adjuster 5 adjusts the cooperative controller 4 in terms of gain will now be described with reference to FIG. 2. In step 9, the width for the gain change is selected. A typical way to select the width for the gain change is what is known as random search, to be described later. The random search involves changing the width for gain change at random. A new gain is determined on the basis of the selected width for the gain change. The cooperative controller 4 is adjusted and set for the new gain (step 10). In step 11, a check is made to see if the control response of the controlled target system 8 has improved based on the control signal $U_i$ reflecting the cooperative control signal ui generated in the cooperative controller 4 with its gain adjusted. If no improvement is detected in the control response, steps 9 through 11 are repeated. When the control response is found to be improved, the process of step 10 is carried out based on the width for the gain change selected in step 9. This process, too, adjusts the cooperative controller 4 in terms of gain and sets the controller 4 for the updated gain.

Figure 2:
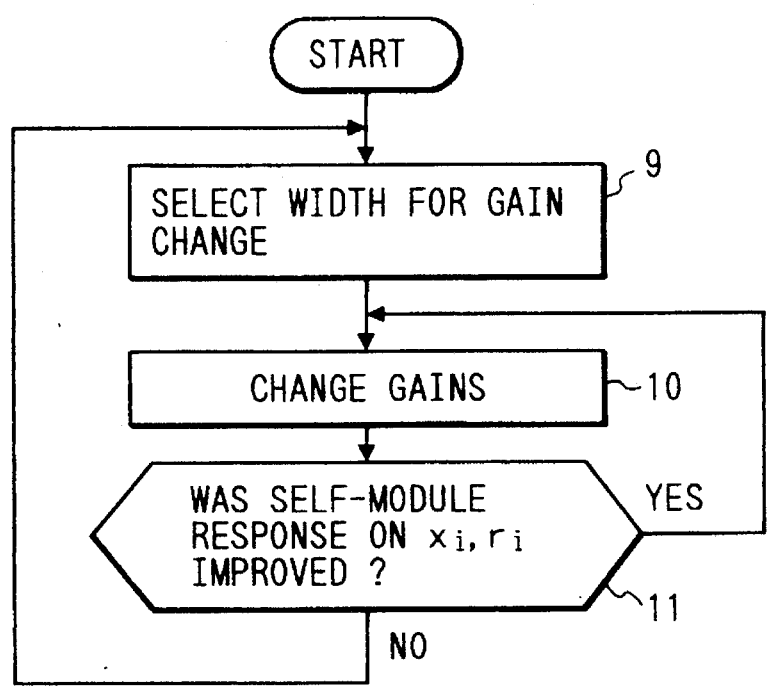
FIG. 2 is a flowchart showing an example of the processing carried out by the adjuster in FIG. 1.

There are a number of ways to check the improvement in the control response described above. A first way to make the check involves checking for any improvement in the control response achieved as a result of having the cooperative controller 4 adjusted for its gain, the check being based on the system variable $x_i$ and reference value $r_i$ of the current module. This type of check may be called an egoistic cooperative judgment. Step 11 in FIG. 2 is the process of checking for any improvement in the control response through the egoistic cooperative judgment. The process of control reflecting the cooperative control signal $u_i$, output by the cooperative controller 4 with its gain adjusted by the egoistic cooperative judgment, may be called egoistic cooperative control.

Figure 3:
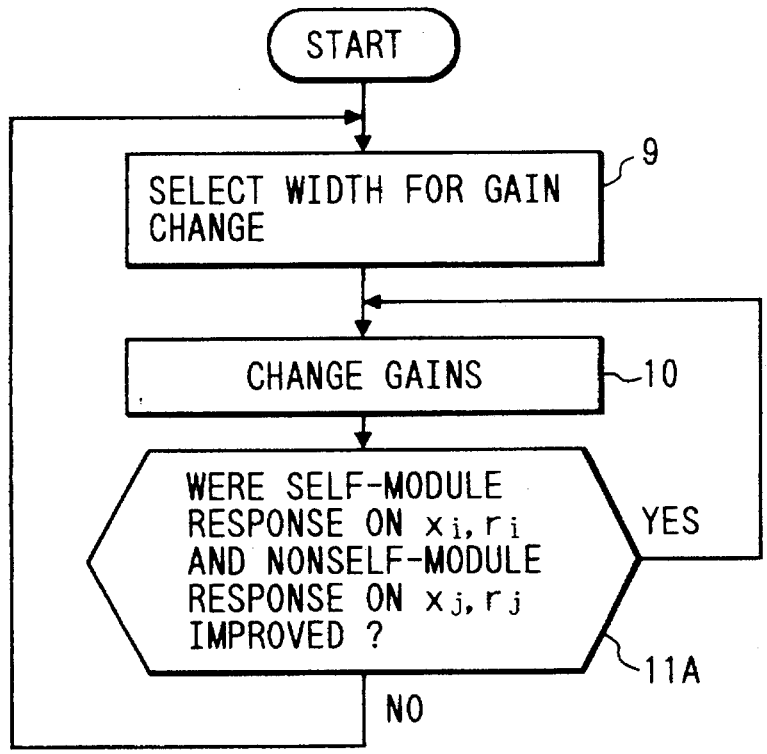
FIG. 3 is a flowchart showing another example of the processing of FIG. 2.
Figure 4:
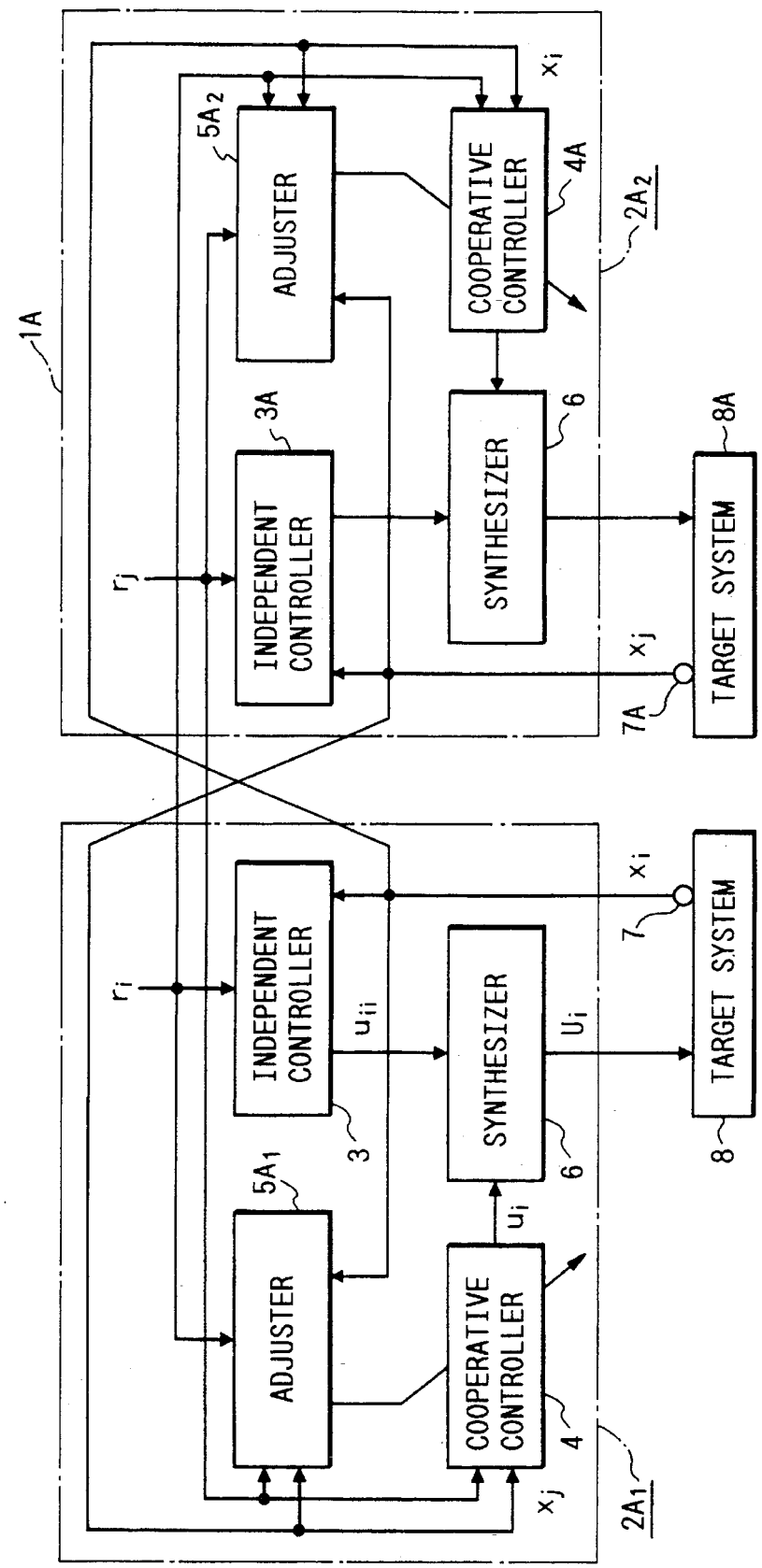
FIG. 4 is a block diagram of another control system embodying the invention.

A second way to check the improvement in the control response involves checking for any improvement in the control response attained as a result of having the cooperative controller 4 adjusted for its gain, the check being based on the system variable $x_i$ and reference value $r_i$ of the current module as well as on the system variable $x_j$ and reference value $r_j$ of the another module. This type of check may be called an altruistic cooperative judgment. Step 11A of FIG. 3 checks for any improvement in the control response trough the altruistic cooperative judgment. FIG. 3 shows another example of the processing carried out by the adjuster 5. Steps 9 and 10 of FIG. 3 are identical to those of FIG. 2. The process of control reflecting the cooperative control signal $u_i$, output by the cooperative controller 4 with its gain adjusted by the altruistic cooperative judgment, may be called altruistic cooperative control. FIG. 4 is a block diagram of another control system 1A embodying the invention. The control system 1A carries out the processing of FIG. 3.

The control system 1A comprises controller modules 2A1 and 2A2. The controller module 2A1 has a independent controller 3, a cooperative controller 4, an adjuster 5A1 and a synthesizer 6. The controller module 2A2 includes a independent controller 3A, a cooperative controller 4A, an adjuster 5A2 and a synthesizer 6. The adjuster 5A1 receives the system variable $x_i$ and reference value $r_i$ of the current module as well as the system variable $x_j$ and reference value $r_j$ of the another module, and carries out the processing of FIG. 3. The adjuster 5A2 performs the same processing as the adjuster 5A1.

Egoistic cooperative control has the advantage of being implemented easily and of allowing each of the controller modules configured to be highly independent of one another. Altruistic cooperative control, by contrast, does not offer each controller module as much independence as egoistic cooperative control does but provides a different advantage. Even if any of the independent and cooperative controllers fails in one controller module, the system variables controlled by the failed controller(s) continue to be controlled to a certain extent by another controller module operating normally.

One specific way to carry out the above-mentioned egoistic cooperative judgment is to evaluate the values of the square integral of the control deviation (e.g., $(x_i-r_i)$) over a predetermined period of time. A reduction in the value indicates an improvement. Another way to perform the egoistic cooperative judgment is to fit the control response over a predetermined period of time into a transfer function in order to obtain characteristic values. A reduction in the value of the real part of the characteristic value closest to the real axis (usually a negative value) points to an improvement. The latter way to perform the egoistic cooperative judgment specifically involves having the adjusters 5 and 5A input the system variable $x_i$. That is, to carry out the egoistic cooperative judgment requires getting at least measured values of the system variable $x_i$.

One specific way to execute the above-mentioned altruistic cooperative judgment is to find a weighted sum of the square integrals of two control deviations (e.g., $(x_i-r_i)$ and $(x_j-r_j)$). The weighted sum is then used to check for an improvement in the control response.

A function representing the independent control rule stored in the independent controller 3A of the controller module 2A differs from the comparable function of the independent controller 3. Similarly, a function representing the cooperative control rule stored in the cooperative controller 4A of the controller module 2A is different from the comparable function of the cooperative controller 4. Except for these points, the controller module 2A is substantially the same in constitution as the controller module 2; the capabilities of the independent controller cooperative controller 4A, adjuster 5A and synthesizer 6 of the controller module 2A are identical to those of the independent controller 3, cooperative controller 4, adjuster 5 and synthesizer 6 of the controller module 2. The adjuster 5A adjusts the cooperative controller 4 in such a way that leaves unaffected the system variable $x_j$ of the target system 8A. This is accomplished in particular by canceling those effects on the input system variable $x_j$ which stem from the system variable $x_i$ coming from the other module (i.e., controller module 2) controlling the target system 8.

With this embodiment having two controller modules, the outputs of the cooperative controllers do not enter the independent controllers whose outputs in turn are not fed to the former controllers. The target systems are controlled according to the outputs of the independent and cooperative controllers corresponding to the target systems. Even if one cooperative controller fails, the objects are controlled continuously. Since the independent and the cooperative controller operate normally in one controller module, that controller module may have its target system reflect the system variable of the other module even if interference occurs between changing system variables of the two target systems. This in turn makes it possible to suppress interference of that kind.

The control system 1 of the above embodiment has a cooperative controller incorporated in each of the controller modules configured. This means that the target systems 8 and 8A of the controller modules 2 and 2A are controlled appropriately even if a change in the system variable of the target system controlled by one controller module affects the system variable of the target system controlled by the another controller module, the target system of the latter controller module in turn affecting the system variable of the target system of the former controller module (i.e., interference). In each controller module of the control system 1, the cooperative controller of the current module inputs measured values of the system variable of the target system controlled by the another module. If interference occurs between changing system variables of a plurality of target systems, this setup allows the system variable of each target system to be optimally adjusted in a very short time, with the respective target systems suitably controlled. The control system 1 of this embodiment applies to cases where a plurality of target systems are controlled by a system in which the change in the system variable of one target system and the change in the system variable of another target system interfere with each other. Because this embodiment has two controller modules each incorporating both a independent controller inputting measured values of the system variable from the target system controlled by the current module and a cooperative controller inputting measured values of the system variable from the target system controlled by the another module, the two target systems may be controlled either directly by the independent and cooperative controller of each controller module or indirectly by use of the system variables. The two system variables are thus suitably controlled in a shorter time than ever before.

In particular, the control system 1 has each of its controller modules incorporate a independent and a cooperative controller, the independent controller inputting measured values of the system variable from the target system controlled by the current module and outputting the independent control signal $u_{ii}$, the cooperative controller inputting measured values of the system variable from the target system controlled by the another module and outputting the cooperative control signal $u_i$. Each controller module is thus capable of correcting the independent control signal $u_{ii}$ for the target system of the current module by use of the cooperative control signal ui that reflects the effect of the change in the system variable from the target system of the another module. The synthesizer may be regarded as an apparatus that corrects the independent control signal $u_{ii}$ using the cooperative control signal $u_i$. By correcting the independent control signal $u_{ii}$ using the cooperative control signal $u_i$, each controller module ensures the independent control capability regarding the target system of the current module. Even if interference occurs between changing system variables of a plurality of target systems, the system variable of each target system is suitably adjusted in a very short time by controlling that target system.

Broadly speaking, the cooperative controller and the synthesizer both have a cooperating capability. That is, the two units may each be regarded as a correct apparatus that performs corrective action from a cooperative point of view. Given the system variable from the target system controlled by the another module, the correct apparatus corrects the independent control signal of the current module in a manner that cancels any adverse effect on the signal resulting from control of the another module.

This embodiment has a synthesizer that corrects the output of a independent controller using that of a cooperative controller in each controller module. Thus if the cooperative controller fails in any controller module, the independent controller can control the corresponding target system to be controlled.

Each controller module in the control system disclosed in Japanese Patent Laid-Open No. 240897/1989 performs cooperative control by inputting the information (the output of the independent controller in another controller module) processed by another controller module. However, since the cooperative controller in each controller module of the control system 1 provides cooperative control by inputting measured values of the system variable input into another module. In the control system 1, this makes it possible to reflect quickly the result of cooperative control in the ongoing operation. In a transient state where changing system variables of a plurality of target systems interfere with each other, the control response of a predetermined target system is made quicker by this embodiment. Thus, according to this embodiment, the controlled state of the target system is optimized more quickly than the control system disclosed in Japanese Patent Laid-Open No. 240897/1989.

The independent controller of each controller module in the control system disclosed in Japanese Patent Laid-Open No. 240897/1989 inputs the output of the cooperative controller in the current module. However, the control system 1 of present embodiment generates new control signal $U_i$ by correcting the independent control signal $u_{ii}$ using the cooperative control signal $u_i$ in the transient state, and controls the target system by the new control signal $U_i$. This also make for quick control response for a predetermined target system in a transient state where changing system variables of a plurality of target systems interfere with each other. Thus, according to this embodiment, the controlled state of the target system is optimized more quickly than the control system disclosed in Japanese Patent Laid-Open No. 240897/1989.

Each controller module inputs not the specifically processed information mentioned above but measured values of an unprocessed system variable. This also contributes to improving the control response of a given target system under control.

Since each of the controller modules of this embodiment has a independent and a cooperative controller, each controller module may be readily switched into either independent control mode or combined independent and cooperative control mode depending on the relations of the target systems involved. If no interference occurs between changing system variables of a plurality of target systems, each of the controller modules involved has its independent controller control the corresponding target system (i.e., in independent control mode). If interference develops between changing system variables of a plurality of controlled target systems, each of the controller modules involved controls the corresponding target system based on the outputs of the independent and the cooperative controller (in combined independent and cooperative control mode). The switching of the two modes is necessarily effected when the cooperative controller of a given controller module receives the system variable from the target system of another module connected. The reason for this is that the cooperative controller inputting a change in the system variable outputs a cooperative control signal accordingly. There is no need to provide means for switching between independent control mode and combined independent and cooperative control mode. It follows that each of the controller modules configured is structured simply.

With each controller module, the adjuster adjusts the gain of the cooperative controller. This makes it possible to control each target system in a manner that reflects cooperative control regardless of diverse cases of unpredictable interference between changing system variables of a plurality of target systems, or irrespective of the degree of such interference. In such cases where the changing system variables of the multiple target systems under control interfere with one another, each of the system variables is optimally adjusted for each target system. In particular, because the adjuster inputs measured values of the system variable of the current module, the gain of the cooperative controller is optimized in a short time. Upon transition for the first time from no interference between changing system variables of a plurality of target systems to such interference, the gain of the cooperative controller is adjusted by the corresponding adjuster in a way that cancels the adverse effects of the transition. After the gain is adjusted and noninterference is achieved between the changing system variables of the multiple target systems, a state of such interference may again occur. In that case, the cooperative controller with its gain adjusted outputs a cooperative control signal for canceling the adverse effects of the lapse using the previously adjusted gain.

In each controller module of this embodiment, the independent and the cooperative controller each input values measured by a separate sensor. The independent controller inputs measured values of the system variable from the target system controlled by the current module, while the cooperative controller inputs measured values of the system variable from the target system controlled by the another module. This constitution ensures the independence of each controller module and allows the current module to provide cooperative control for canceling the adverse effects resulting from control of the another modules. The adjuster in each controller module adjusts the gain of the cooperative controller in a way that cancels the adverse effects.

The benefits of the above embodiment are also available from the control system 1A of FIG. 4.

Another control system 1C embodying the invention is described with reference to FIG. 5. This embodiment involves supplementing the control system 1 of FIG. 1 with a third controller module 2B and a sensor 7B. In this constitution, the controller modules 2, 2A and 2B are connected in a loop. The controller module 2B is identical to the modules 2 and 2A in constitution and controls an target system 8B.

Transmission of data among the three modules allows the cooperative controller of the module 2 to input values of system variables $x_2$ and $x_3$ measured by the sensors 7A and 7B as well as reference values $r_2$ and $r_3$ of the controller modules 2A and 2B. The cooperative controller 4A of the controller module 2A inputs values of system variables $x_1$ and $x_2$ measured by the sensors 7 and 7B as well as reference values $r_1$ and $r_3$ of the controller modules 2 and 2B. A cooperative controller 4B, not shown, of the controller module 2B inputs values of the system variables $x_1$ and $x_2$ measured by the sensors 7 and 7A as well as the reference values $r_1$ and $r_2$ of the controller modules 2 and 2A. A cooperative controller 4 (not shown) outputs a cooperative control signal $u_1(=f_{12}(x_2)+f_{13}(x_3))$. The function with its suffix j being 2 ($f_{12}(x_2)$) is a function that expresses the cooperative control rule of the controller module 2A. The function with its suffix j being 3 ($f_{13}(x_3)$) is a function that represents the cooperative control rule of the controller module 2B. A cooperative controller 4A (not shown) outputs a cooperative control signal $u_2 (=f_{21}(x_1)+f_{23}(x_3))$. The function with its suffix j being 1 ($f_{21}(x_1)$) is a function that represents the cooperative control rule of the controller module 2B. The cooperative controller 4B outputs a cooperative control signal $u_3(=f_{31}(x_1)+f_{32}(x_2))$.

The above embodiment offers the same benefits as the embodiment of FIG. 1.

Figure 6:
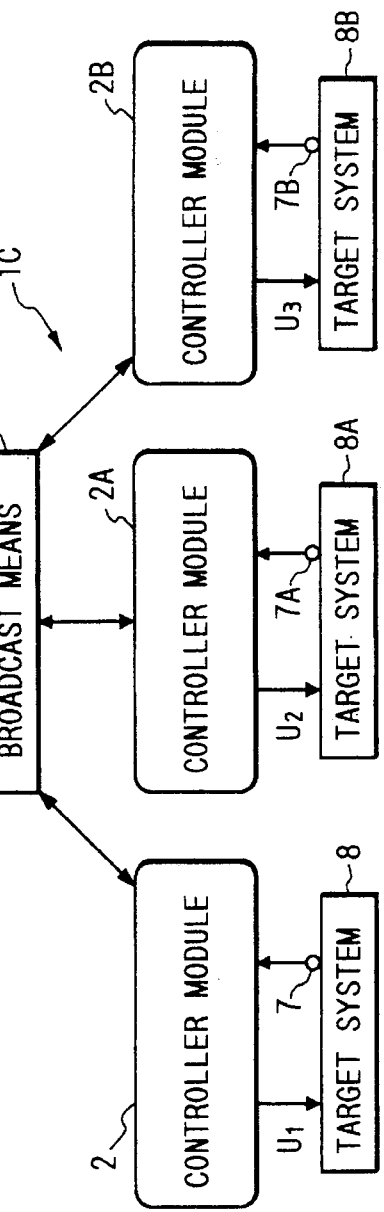
FIG. 6 is a block diagram of an even further control system embodying the invention.

FIG. 6 is a block diagram of another control system 1C embodying the invention in a different setup of data communication. In this embodiment, data from each of controller modules 2, 2A and 2B is transmitted to the other modules via a broadcast means 12. The broadcast means 12 is cognizant of the number of the controller modules constituting the control system 1C. The constitution requires the broadcast means 12 to transmit data from any one controller module to the other controller modules.

This embodiment also offers the same benefits as the embodiment of FIG. 1. The embodiment of FIG. 6 provides an additional benefit of requiring data communication less often between the modules configured than the embodiment of FIG. 5. Furthermore, if the broadcast means 12 has the ability to detect system variables of the target systems controlled by the controller modules, two more benefits are available: the amount of data communicated between the controller modules is reduced, and the system variable from the target system of a failed controller module can be referenced by any other controller module.

Figure 7:
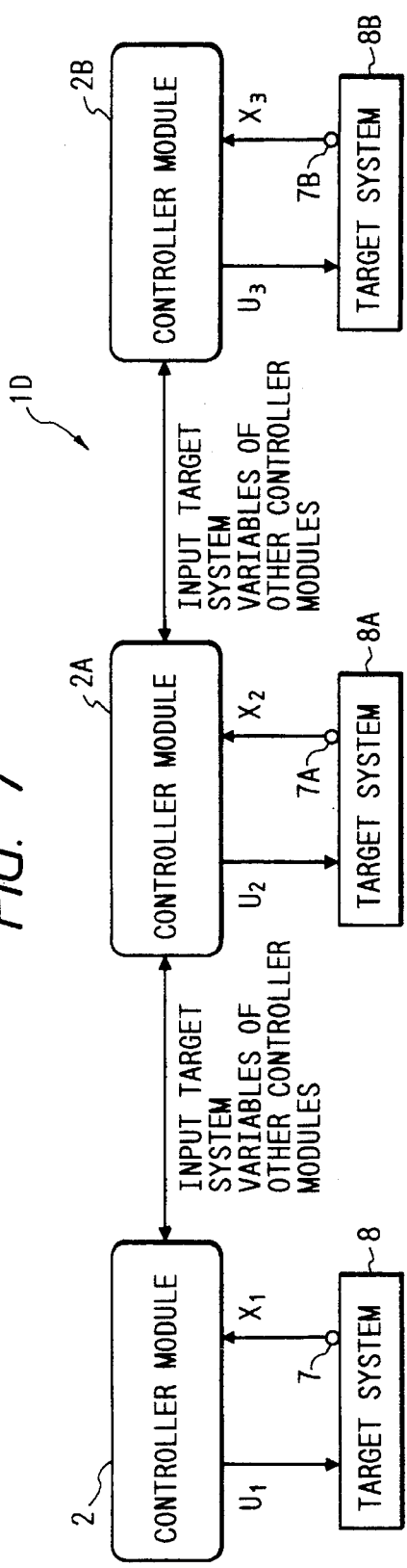
FIG. 7 is a block diagram of a still further control system embodying the invention.

FIG. 7 is a block diagram of another control system 1D embodying the invention and based on a data transmission setup different from that of the control system 1C of FIG. 6. A cooperative controller 4A, not shown, of the controller module 2A inputs measured values of system variables $x_1$ and $x_3$. A cooperative controller 4 (not shown) of the controller module 2 and a cooperative controller 4B (not shown) of the controller module 2B input measured values of a system variable $x_2$. It should be noted that the cooperative controller 4 does not input measured values of the system variable $x_3$, nor does the cooperative controller 4B input measured values of the system variable $x_1$. This is because interference occurs through the target system 8A between the changing system variables of the target systems 8 and 8B. In this setup, a good control response can be maintained by having the cooperative controllers 4 and 4B input measured values of the system variable $x_2$.

Figure 5:
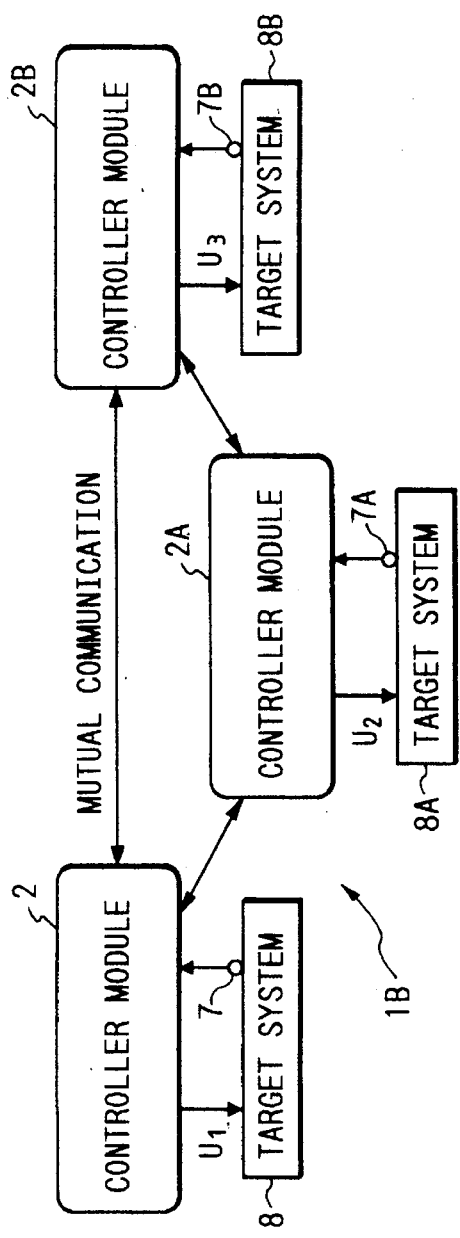
FIG. 5 is a block diagram of a further control system embodying the invention.
Figure 8:
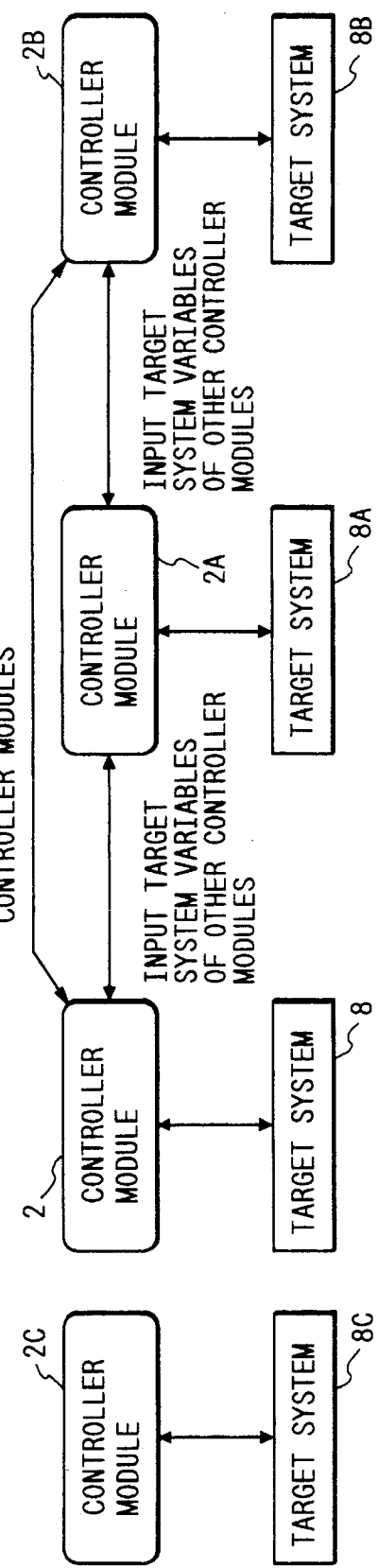
FIG. 8 is a schematic view depicting how the embodiment of FIG. 5 is used illustratively.

FIG. 8 is a schematic view depicting how the controller modules in the control system 1B of FIG. 5 operate illustratively. In FIG. 8, the controller module 2C is identical in constitution to the controller module 2 of FIG. 1. The controller module 2C does not input measured values of a system variable $x_4$ from the target system controlled by the current module; the module 2C operates on a stand-alone basis. The controller modules 2, 2A and 2B start cooperative control by inputting a system variable other than that from the target system 8C or that from the current module. On the other hand, the controller module 2C provides independent control alone on the target system 8C. If the controller module 2 is disconnected from the controller modules 2A and 2B, the controller module 2 operates on a stand-alone basis and provides independent control only on the target system 8. In this manner, each of the controller modules configured in FIG. 1 may provide either of two kinds of control: combined independent and cooperative control, or independent control only.

Figure 9:
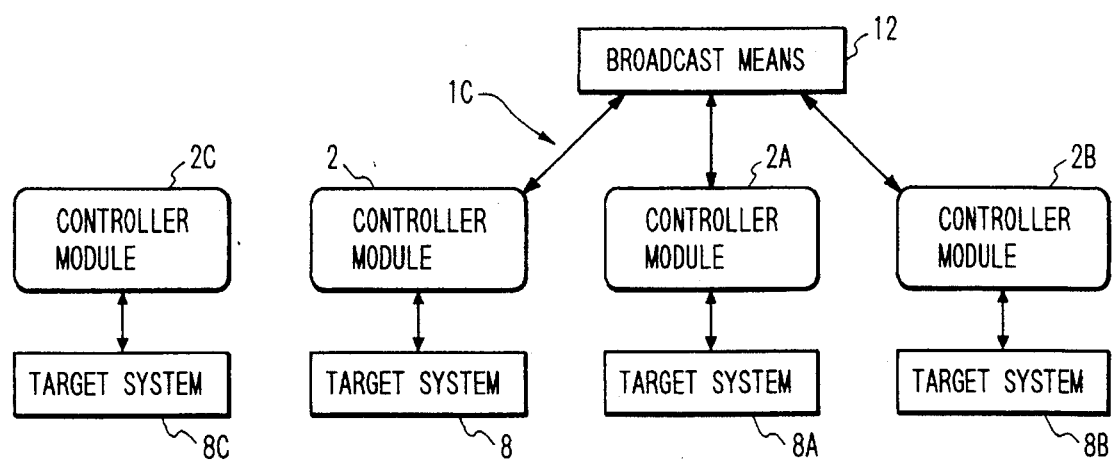
FIG. 9 is a schematic view outlining how the embodiment of FIG. 6 is used illustratively.

FIG. 9 outlines how the controller modules of the control system 1C in FIG. 6 are used illustratively. The setup of FIG. 9 works in the same manner as that of FIG. 8.

Figure 10:
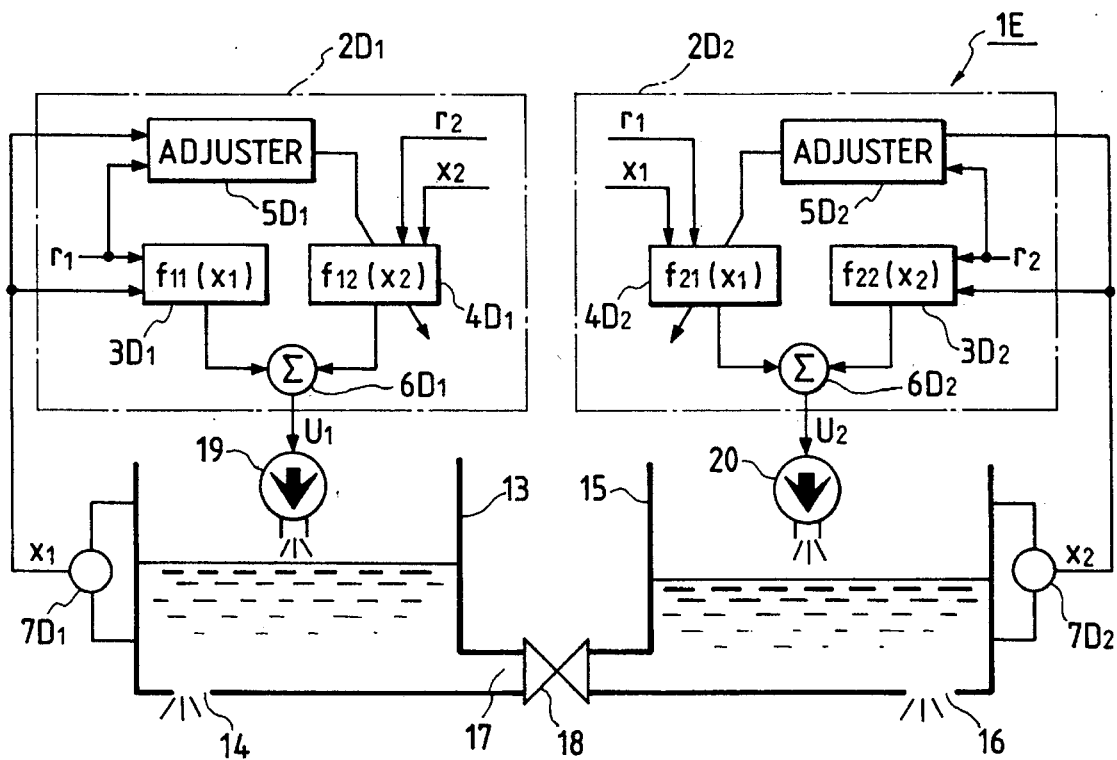
FIG. 10 is a schematic view of a control system embodying the invention, the system providing water level control over a tank setup.

FIG. 10 is a schematic view of another control system 1E embodying the invention, the system providing water level control of a tank setup used typically in a chemical plant. The constitution of the devices controlled by the control system 1E is described first. Referring to FIG. 10, two tanks 13 and 15 are connected via a pipe 17. A valve 18 is attached to the pipe 17. The tanks 13 and 15 have outlets 14 and 16, respectively. The water discharged by a pump 19 is supplied to the tank 13. When the valve 18 is closed, the supplied water is discharged from the tank 13 through the outlet 14. The water fed by a pump 20 is supplied to the tank 15. When the valve 18 is closed, the supplied water is discharged from the tank 15 through the outlet 16. Reference numerals $7D_1$ and $7D_2$ denote water gauges. The pumps 19 and 20, working as flow rate adjusters, are furnished in water supply apparatus (including the pipes with outlets extending downward from the pumps 19 and 20 in FIG. 10) which guide water discharged by the pumps 19 and 20 into the tanks 13 and 15.

The control system 1E comprises controller modules $2D_1$ and $2D_2$. The controller module $2D_1$ includes a independent controller $3D_1$, a cooperative controller $4D_1$, an adjuster $5D_1$ and a synthesizer $6D_1$; the controller module $2D_2$ has a independent controller $3D_2$, a cooperative controller $4D_2$, an adjuster $5D_2$ and a synthesizer $6D_2$. The controller modules $2D_1$ and $2D_2$ are substantially the same in constitution as the controller modules 2 and 2A in FIG. 1 with the exception of the control functions involved.

The independent controller $3D_1$ stores a independent control rule $f_{11}(x_1)$ expressed by equation (4).

$$u_{11} = f_{11}(x_1) = K1 \cdot (x_1 - r_1) + K2 \cdot s \cdot x_1 + K3 \cdot \frac{1}{s} \cdot (x_1 - r_1) \quad (4)$$

where, $f_{11}(x_1)$ stands for the same independent control rule as that expressed by $f_{ii}(x_i$ in equation (1) given earlier; K1, K2 and K3 are independent control gains; $r_1$ denotes the reference value of the water level $x_1$; and s represents a Laplace operator.

The independent controller $3D_2$ stores a independent control rule $f_{22}(x_2)$ expressed by equation (5).

$$u_{22} = f_{22}(x_2) = K6 \cdot (x_2 - r_2) + K7 \cdot s \cdot x_2 + K8 \cdot \frac{1}{s} \cdot (x_2 - r_2) \quad (5)$$

where, K6, K7 and K8 are independent control gains; and $r_2$ is the reference value of the water level $x_2$.

The independent controller $4D_1$ stores a independent control rule $f_{12}(x_2)$ expressed by equation (6) below and corresponding to the rule $f_{ij}(x_j)$ in equation (3) given earlier.

$$u_1 = f_{11}(x_2) = K4 \cdot (x_2 - r_2) + K5 \cdot s \cdot x_2 \quad (6)$$

where, K4 and K5 are cooperative control gains.

The cooperative controller $4D_2$ stores a cooperative control rule $f_{21}(x_1)$ expressed by equation (7).

$$u_2 = f_{21}(x_1) = K9 \cdot (x_1 - r_1) + K10 \cdot s \cdot x_1 \quad (7)$$

where, K9 and K10 are cooperative control gains.

The controller module 2D1 controls the revolutions of the pump 19 to regulate the water level in the tank 13. The controller module 2D2 controls the revolutions of the pump 20 to regulate the water level in the tank 15. When the valve 18 is closed, the controller modules $2D_1$ and $2D_2$ each operate on a stand-alone basis. The independent controller $3D_1$ inputs measured values of the water level $x_1$ (i.e., system variable) detected by the water gauge $7D_1$, computes the rule $f_{11}(x_1)$, and outputs a independent control signal $u_{11}$ obtained from the computation. The synthesizer $6D_1$ computes the following equation (8) and outputs a control signal $U_1$ accordingly.

$$U_1 = u_{11} + u_1 = f_{11}(x_1) + f_{12}(x_1) \quad (8)$$

Because the cooperative controller $4D_1$ does not output the cooperative control signal $u_1$, the control signal $U_1$ is equal to the independent control signal u11. The revolutions of the pump 19 are controlled by use of the independent control signal $u_{11}$.

The independent controller $3D_2$ inputs measured values of the water level $x_1$ from the water gauge $7D_2$, computes the rule $f_{22}(x_2)$, and outputs a independent control signal $u_{22}$ resulting from the computation. The synthesizer $6D_2$ computes the following equation (9) and outputs a control signal $U_2$ accordingly.

$$U_2 = u_{22} + u_2 = f_{22}(x_2) + f_{21}(x_1) \quad (9)$$

Because the cooperative controller $4D_2$ does not output the cooperative control signal $u_2$, the revolutions of the pump 20 are controlled by use of the independent control signal $u_{22}$.

Figure 11:
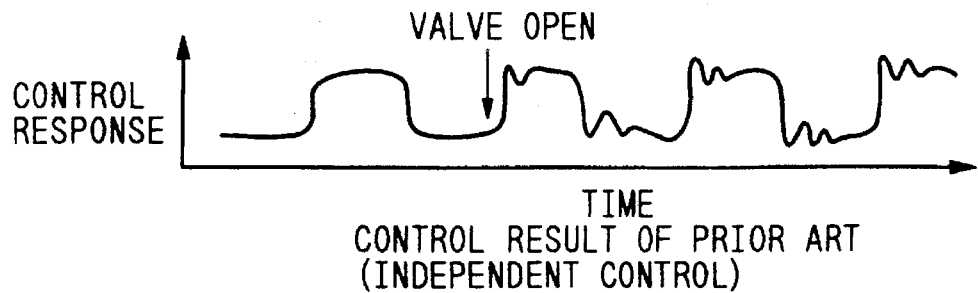
FIG. 11 is a graphic representation of the control response in a typical conventional independent control setup.

When the valve 18 is opened, the two tanks have their contents physically interact, i.e., the change in the water level $x_1$ interfering with the change in the water level $x_2$. Under independent control with each controller module operating on a stand-alone basis, this interference generates considerable vibrations in the control response of the water levels of both tanks, as illustrated in FIG. 11. The vibrations make it impossible to control the water levels $x_1$ and $x_2$ appropriately.

Figure 13:
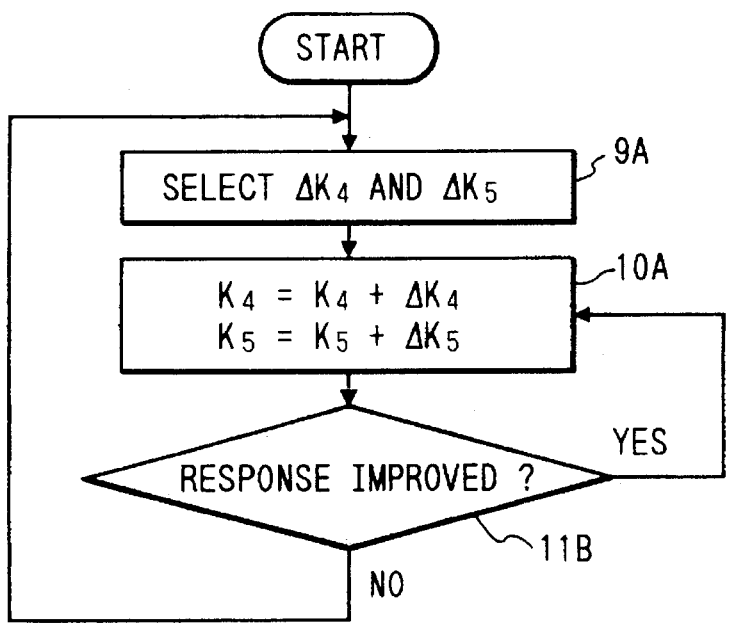
FIG. 13 is a flowchart of the processing performed by the adjuster in FIG. 10.

When the valve 18 is operated for the first time and opened fully, the adjuster $5D_1$ adjusts each gain in the cooperative control rule function of the cooperative controller $4D_1$, and the adjuster $5D_2$ adjusts each gain in the cooperative control rule function of the cooperative controller $4D_2$. Illustratively, the cooperative controller is adjusted in terms of gain by the adjuster $5D_1$ as follows. FIG. 13 outlines the processing performed by the adjuster as a variation of the processing of FIG. 2. In step 9A of FIG. 13, the adjuster selects widths $\Delta K4$ and $\Delta K5$ for gain change by which to vary slightly the gains K4 and K5 of the control function for the cooperative controller $4D_1$. The selection of the widths $\Delta K4$ and $\Delta K5$ gain change is accomplished through random search. In step 10A, the new gains K4 and K5 are computed by use of the selected widths $\Delta K4$ and $\Delta K5$ by using the following equations:

$$K4 = K4 + \Delta K4$$

$$K5 = K5 + \Delta K5$$

Before the valve 18 is opened for the first time, the initial values of the gains K4 and K5 are both zero. Each gain of the cooperative controller $4D_1$ is then adjusted for the new gain acquired by the computation above. In step 11B, a check is made to see if there is an improvement in the control response. The check involves using the input system variable $x_1$ and reference value $r_1$ to evaluate the square integral of the control deviation $(x_i - r_i)$ over a predetermined period of time. A reduction in the square integral indicates an improvement in the control response. In case of a "NO" decision in step 11B, step 9A is again reached in which new widths $\Delta K4$ and $\Delta K5$ are selected. A "YES" decision in step 11B is followed by step 10A in which new gains K4 and K5 increased by the same widths $\Delta K4$ and $\Delta K5$ are computed. The cooperative controller $4D_1$ is then adjusted for these gains K4 and K5.

The adjuster $5D_2$ provides gain control of the cooperative controller $4D_2$ so as to improve the control response of the water level $x_2$. In that sense, the above kind of gain control is substantially the same as that of the cooperative controller $4D_1$.

Figure 12:
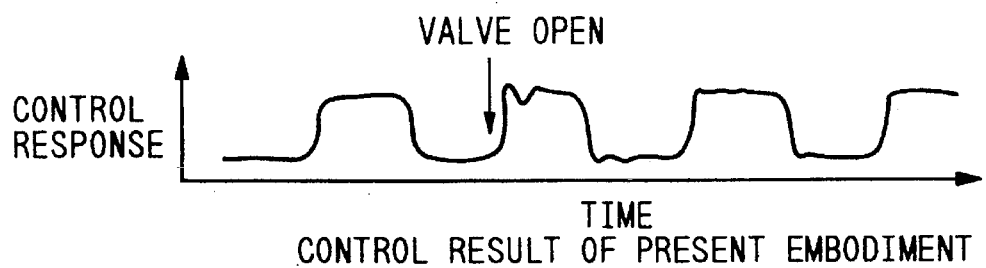
FIG. 12 is a graphic representation of the control response in the case of the embodiment of FIG. 10.

With this embodiment of FIG. 10, the adjusters $5D_1$ and $5D_2$ act, when the valve 18 is fully opened for the first time, to adjust each gain of the functions of the cooperative controllers $4D_1$ and $4D_2$ so that cooperative control of the cooperative controllers $4D_1$ and $4D_2$ is used in combination with the above-mentioned independent control. In this setup, even if the changes in the water levels $x_1$ and $x_2$ interfere with each other when the valve 18 is opened, the control response to the water levels $x_1$ and $x_2$ is improved as illustrated in FIG. 12. That is, although the control response with this embodiment initially takes a vibrating pattern when the valve is opened, the response quickly returns to a neatly square waveform pattern because the gains of the cooperative controllers $4D_1$ and $4D_2$ are adjusted and the two controllers thereby provide cooperative control at the same time as the opening of the valve.

After the valve 18 is fully opened for the first time and the gains of the cooperative controllers $4D_1$ and $4D_2$ are adjusted as described, the valve 18 may be fully closed and then fully opened again. In that case, the changes in the water levels $x_1$ and $x_2$ again tend to interfere with each other. However, since the gains of the cooperative controllers $4D_1$ and $4D_2$ were adjusted by the adjusters $5D_1$ and $5D_2$ when the valve 18 was fully opened the last time, the gains of the cooperative controllers $4D_1$ and $4D_2$ are not adjusted when the valve 18 is fully opened again. Instead, with the valve 18 fully opened, control is immediately effected by use of the control signals $U_1$ and $U_2$ reflecting the cooperative control signals of the cooperative controllers $4D_1$ and $4D_2$ having the already adjusting gains.

If the valve 18 is opened illustratively by half after its full closure, the degree of interference differs from that of the preceding case in which the valve was fully opened. The adjuster then inputs measured values of the system variable from the target system controlled by the current module, and again adjusts the gain of the corresponding cooperative controller accordingly. That is, the adjuster adjusts the gain of the cooperative controller whenever the degree of interference among a plurality of target systems is different from what it was when the gain of the cooperative controller was adjusted most recently.

The control system 1E constituting the embodiment of FIG. 10 thus offers the same effects and benefits as the control system 1 of FIG. 1.

Figure 14:
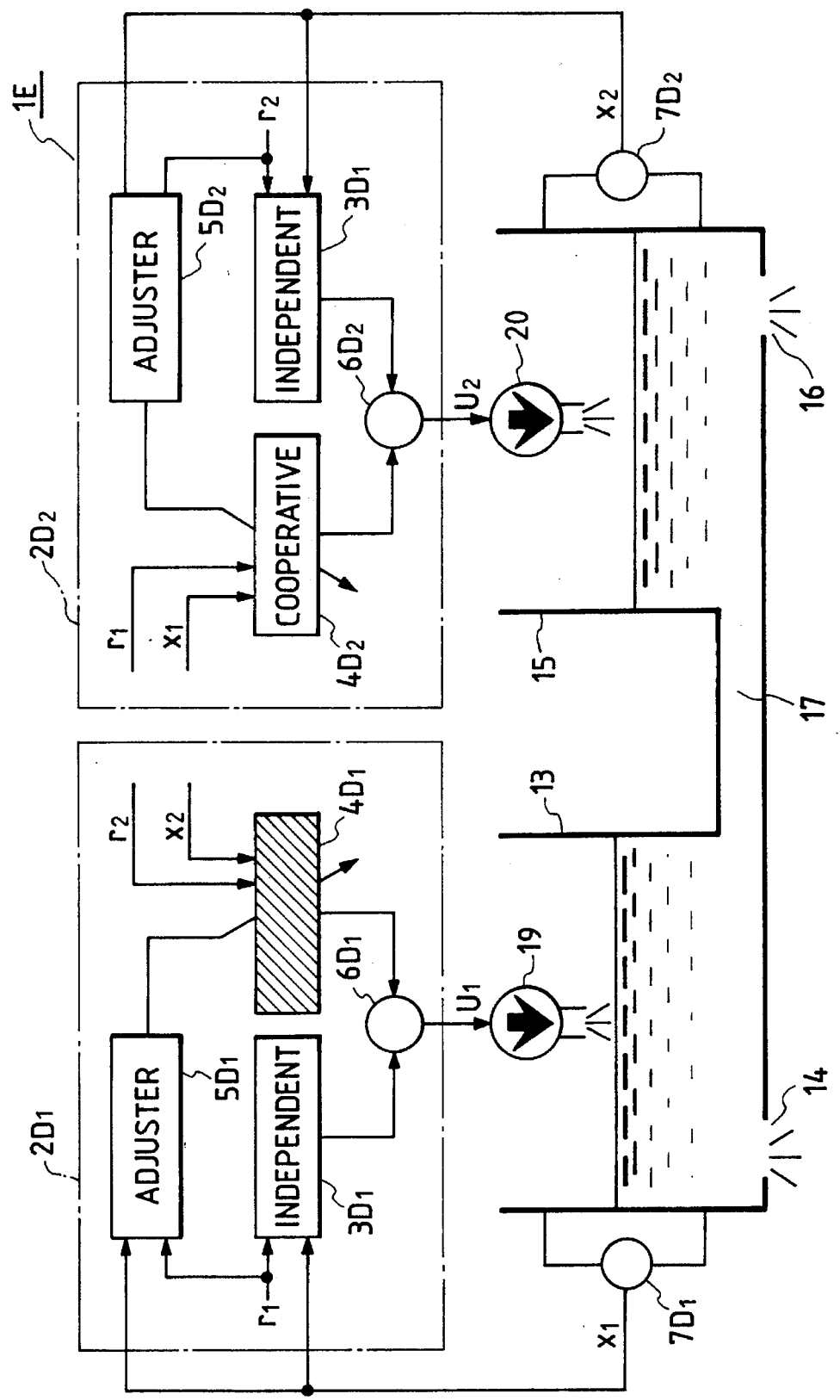
FIG. 14 is a schematic view showing what happens if one of the cooperative controllers in the embodiment of FIG. 10 fails.

With the control system 1E, suppose that the cooperative controller $4D_1$ fails as shown in FIG. 14. In that case, the controller module $2D_1$ containing the failed cooperative controller $4D_1$ enters independent control mode effected by the independent controller $3D_1$ and provides independent control of the water gauge $x_1$. The controller module $2D_2$, with its two controllers (independent controller $3D_2$ and cooperative controller $4D_2$) operating normally, provides independent and cooperative control of the water level $x_2$. The adjuster $5D_2$ carries out an egoistic cooperative judgment in step 11B of FIG. 13 to let the cooperative controller $4D_2$ provide egoistic cooperative control. Thus when the cooperative controller $4D_1$ fails, cooperative control is not carried out on the water level $x_1$. This makes it inevitable for the control response of the water level $x_1$ to get worse than that of the water level $x_2$.

Figure 15:
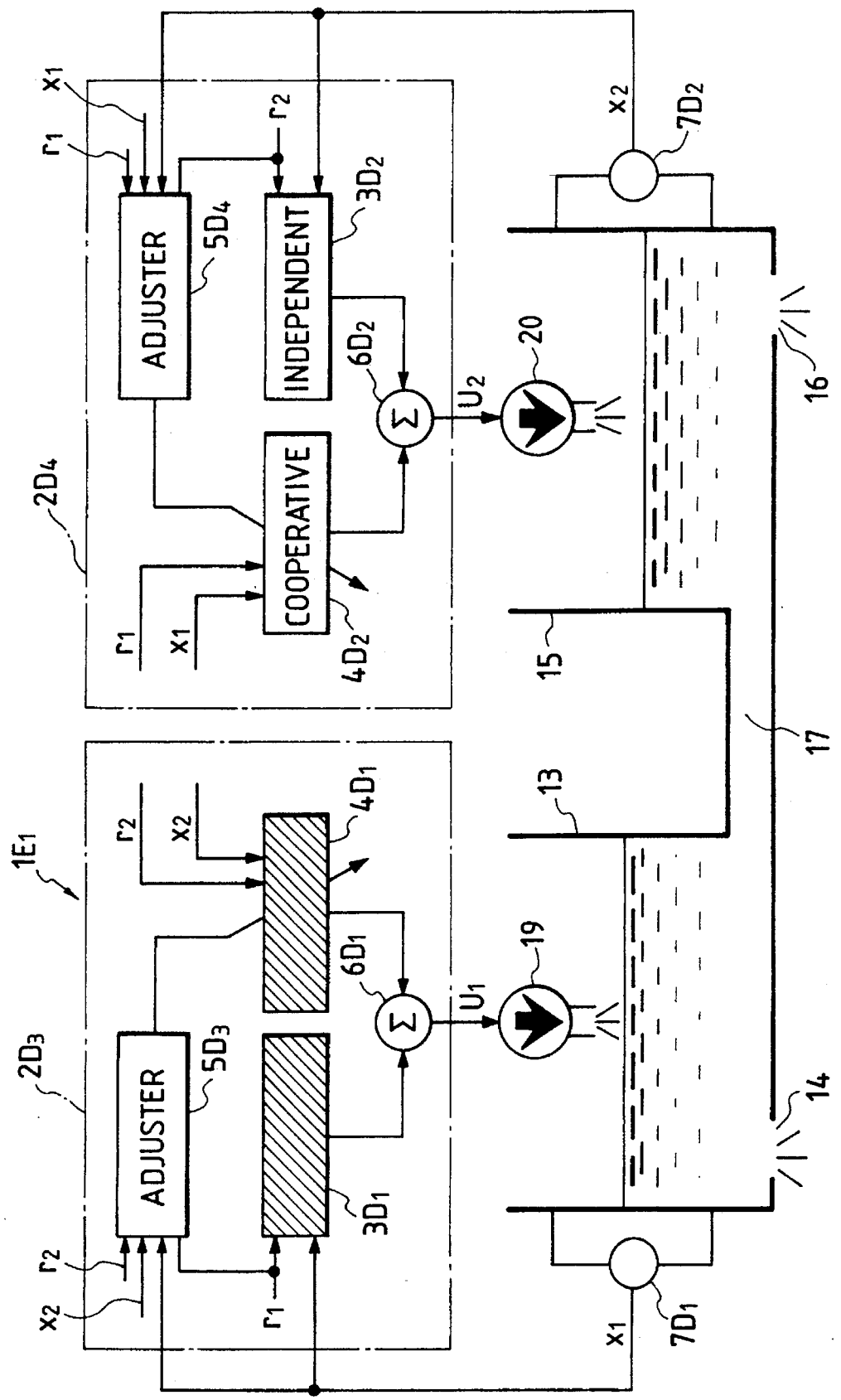
FIG. 15 is a schematic view of a control system embodying the invention, the system providing altruistic cooperative control.

FIG. 15 shows another control system $1E_1$ embodying the invention and comprising controller modules $2D_3$ and $2D_4$. The control system $1E_1$ is a variation of the control system 1A of FIG. 4 providing altruistic cooperative control, the variation being applied to a setup for controlling the water levels $x_1$ and $x_2$ of two tanks. The controller modules $2D_3$ and $2D_4$ in FIG. 15 replace the adjusters $5D_1$ and $5D_2$ of the control modules $2D_1$ and $2D_2$ in FIG. 14 respectively with adjusters $5D_3$ and $5D_4$ for carrying out altruistic cooperative judgments. The cooperative controllers $4D_1$ and $4D_2$ provide altruistic cooperative control. Thus if both the independent controller $3D_1$ and the cooperative controller $4D_1$ in the controller module $2D_3$ fail as shown in FIG. 15, the cooperative controller $4D_2$ controls to a certain extent the water level $x_1$ of the tank 13. In this manner, the embodiment of FIG. 15 provides the same effects and benefits as the embodiment of FIG. 1.

Figure 16:
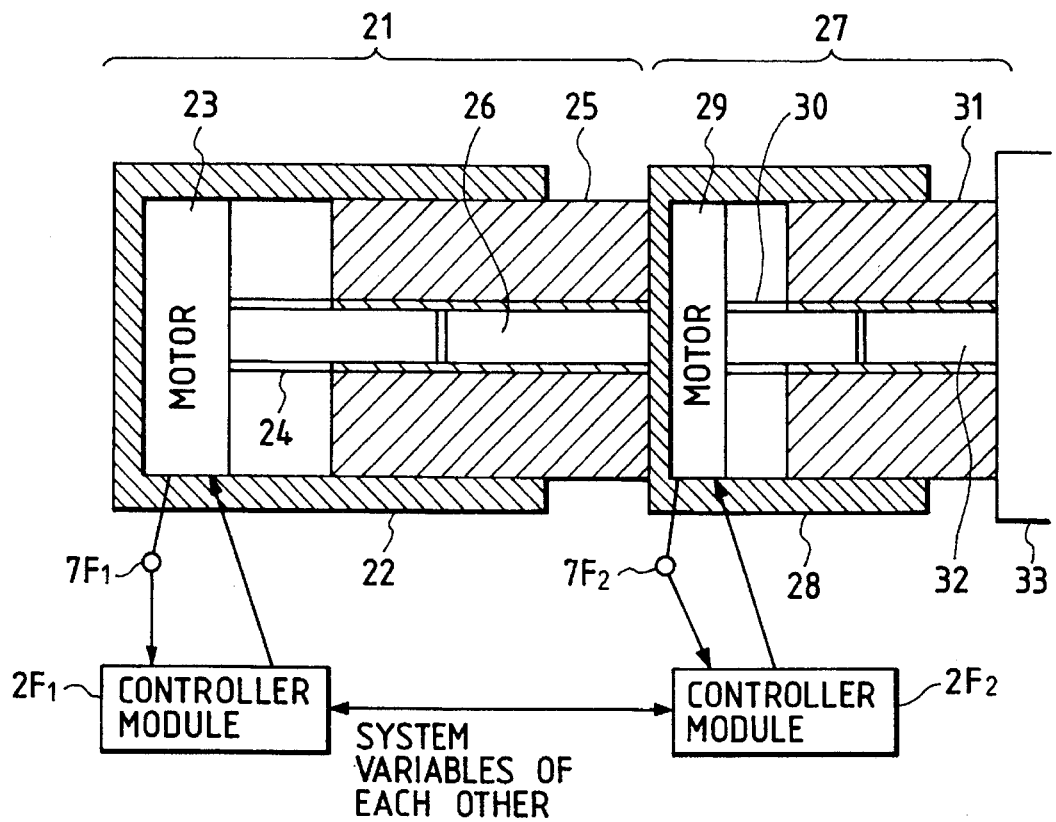
FIG. 16 is a schematic view of a control system embodying the invention, the system controlling an object positioning device.

FIG. 16 is a schematic view of another control system 1F embodying the invention, the system controlling an object positioning device. The object positioning device is constituted by two servo cylinders 21 and 27 combined. The servo cylinder 21 has a cylinder 22, a motor 23 contained in the cylinder 22, and a piston of which the right-hand end protrudes from the cylinder 22 and which moves inside the cylinder 22. A threaded hole 26 is formed in the axial center of the piston 25. The rotating shaft 24 of the motor 23 is threaded and engaged with the threaded hole 26. Different in cylinder and piston sizes, the servo cylinder 27 has substantially the same shape as the servo cylinder 21. The servo cylinder 27 includes a cylinder 25, a motor 29 contained in the cylinder 25, and a piston 31 of which the right-hand end protrudes from the cylinder 25 and which moves inside the cylinder 25. A threaded hole 32 is formed in the axial center of the piston 31. The rotating shaft 30 of the motor 29 is threaded and engaged with the threaded hole 32. Illustratively, the right-hand end of the piston 25 in the servo cylinder 21 is attached removably to the cylinder 28 of the servo cylinder 27.

The cylinder 28 and piston 31 are shorter than the cylinder 22 and piston 25, respectively. The pitch of the threads formed over the rotating shaft 30 and that of the threads in the threaded hole 23 are smaller than the pitch of the threads formed over the rotating shaft 24 and that of the threads in the threaded hole 26, respectively. As the motors 23 and 29 rotate, the pistons 25 an 31 move crosswise within the cylinders 22 and 28, respectively. The cylinder 28 moves crosswise in keeping with the motion of the piston 25. An object 33 in contact with the right-hand end of the piston 32 moves crosswise in keeping with the motion of the pistons 25 and 31 and is positioned where required under control of the control system 1F. The position of the object 33 is coarsely adjusted by the servo cylinder 21 and finely adjusted by the servo cylinder 27.

Figure 18:
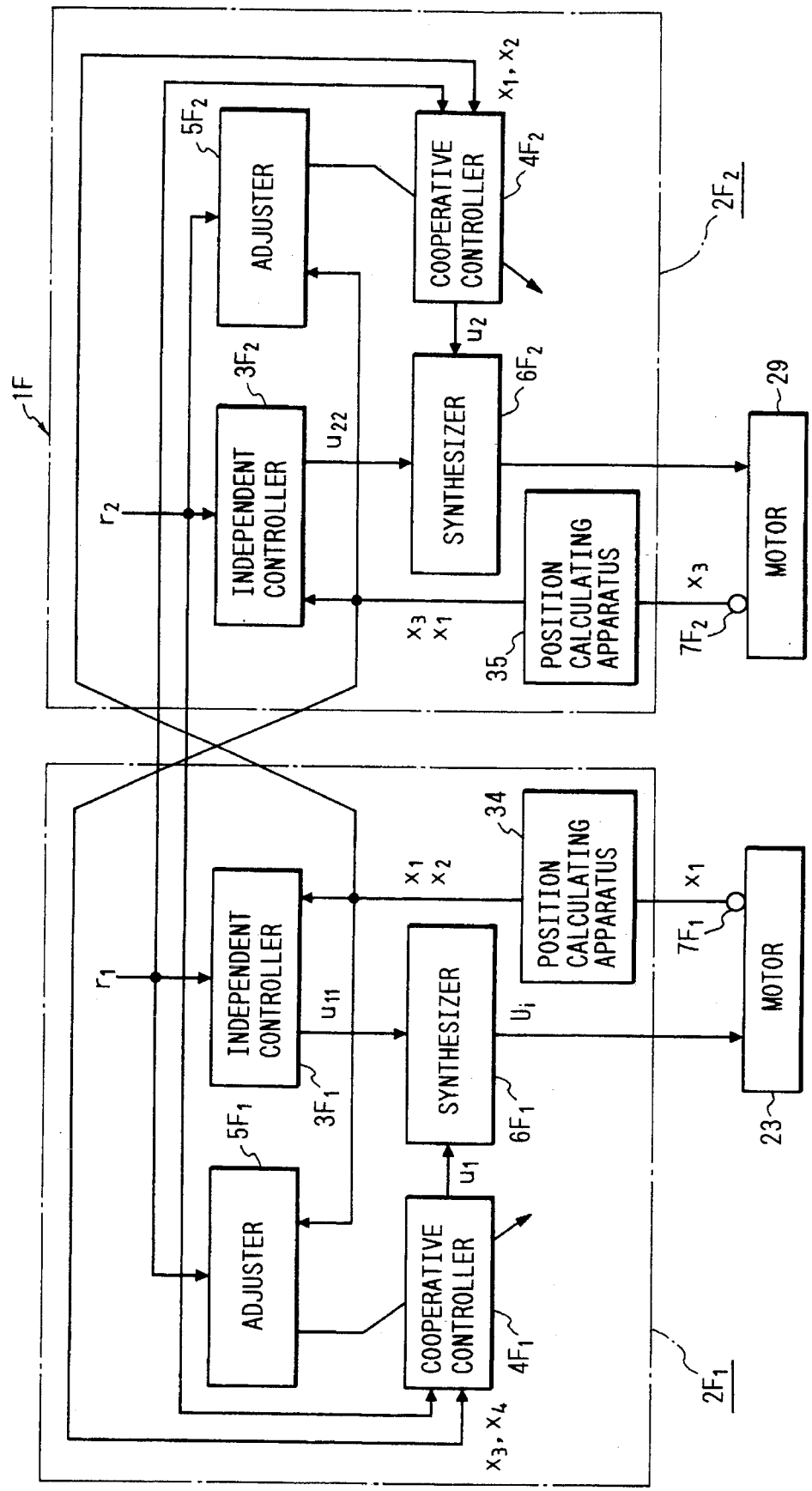
FIG. 18 is a block diagram of the control system in FIG. 16.

The control system 1F has controller modules $2F_1$ and $2F_2$ that control the motors 23 and 29, respectively. A rotation angle displacement detector $7F_1$ detects the amount of rotating angle displacement of the motor 23 and transmits what is detected to the controller module $2F_1$. A rotation angle displacement detector $7F_2$ detects the amount of rotation angle displacement of the motor 29 and informs the controller module $2F_2$ thereof. In practice, the rotation angle displacement detector $7F_1$ detects the right-hand end position of the cylinder 25 while the rotation angle displacement detector $7F_2$ detects the right-hand end position of the cylinder The constitution of the control system 1F will now be described in detail with reference to FIG. 18. The control system 1F comprises control modules $2F_1$ and $2F_2$. The controller module $2F_1$ includes a independent controller $3F_1$, a cooperative controller $4F_1$, an adjuster $5F_1$, a synthesizer $6F_1$ and a position calculating apparatus 34. The controller module $2F_2$ has a independent controller $3F_2$, a cooperative controller $4F_2$, an adjuster $5F_2$, a synthesizer $6F_2$ and a position calculating apparatus 35.

The position calculating apparatus 34 translates the rotation angle displacement $x_1$ of the motor 23 detected by the rotation angle displacement detector $7F_1$ into a position $x_1$ in the moving direction of the cylinder 28, calculating the rate of movement of the cylinder 28 per unit time based on the rotation angle displacement $x_1$. The rate of movement of the cylinder 28 is given as $x_2$ ($=d(x_1)/dt$). The position $x_1$ and the rate of movement $x_2$ represent those actual system variables of the motor 23 which are detected by the detector $7F_1$. These system variables are sent to the independent controller 3F$_1$, to the adjuster 5F$_1$ and to the cooperative controller 4F$_2$. The position calculating apparatus 35 translates the rotation angle displacement x$_3$ of the motor 29 detected by the rotation angle displacement detector 7F$_2$ into a position x$_3$ in the moving direction of the object 33, calculating the rate of movement of the object 33 per unit time based on the rotation angle displacement x$_3$. The rate of movement of the object 33 is given as x$_4$ (=d(x$_3$)/dt). The position x$_2$ and the rate of movement x$_4$ represent those actual system variables of the motor 29 which are detected by the detector 7F$_2$. These system variables are sent to the independent controller 3F$_2$, to the adjuster 5F$_2$ and to the cooperative controller 4F$_1$. The control signal U$_1$ output by the synthesizer 6F$_1$ controls the driving of the motor 23 while the control signal U$_2$ output by the synthesizer 6F$_2$ control the driving of the motor 29.

The control system 1F is thus identical in constitution to the embodiment of FIG. 1 except for the position calculating apparatuses 34 and 35, and offers the same effects and benefits as the latter.

Figure 17:
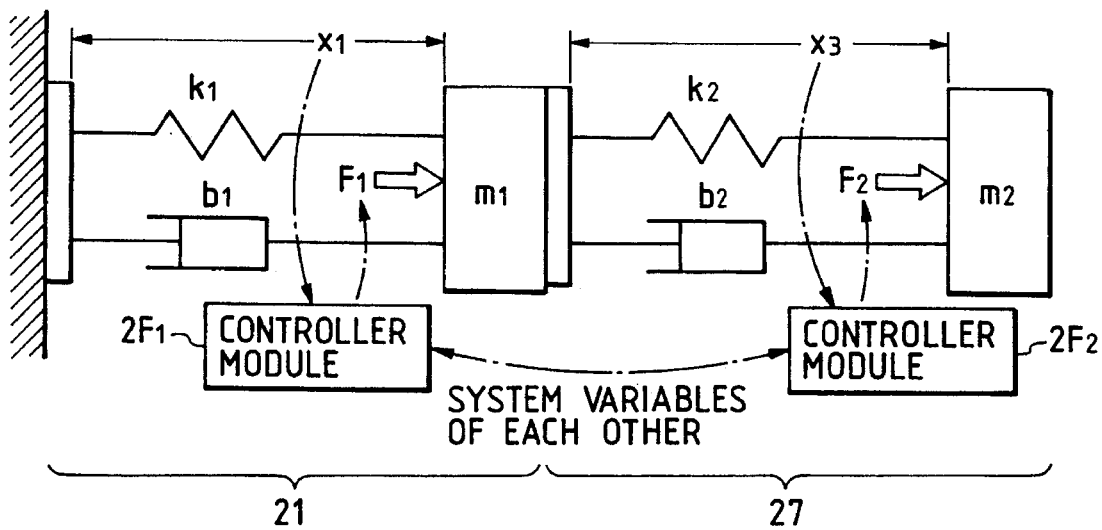
FIG. 17 is a view illustrating a dynamic model of the object positioning device in FIG. 16.

FIG. 17 illustrates a dynamic model of the object positioning device in FIG. 16, the device combining the two servo cylinders 21 and 27. In FIG. 17, reference character m$_1$ is the inertia of the piston 25, and F$_1$ is the force generated by the motor 23 that functions as an actuator. Reference characters x$_1$, k$_1$ and b$_1$ denote the displacement, the viscosity and the rigidity of the servo cylinder 21, respectively. Reference character m$_2$ is the inertia of the piston 31, and F$_2$ is the force generated by the motor 29 that also functions as an actuator. Reference characters x$_2$, k$_2$ and b$_2$ represent the displacement, the viscosity and the rigidity of the servo cylinder 27, respectively.

In controlling the inertia m$_1$, the controller module 2F$_1$ outputs the force F$_1$ as its control output and receives the displacement x$_1$ as the system variable from the target system under control. Likewise, in controlling the inertia m$_2$, the controller module 2F$_2$ outputs the force F$_2$ as its control output and inputs the displacement x$_2$ as the system variable from the target system under control.

Figure 24:
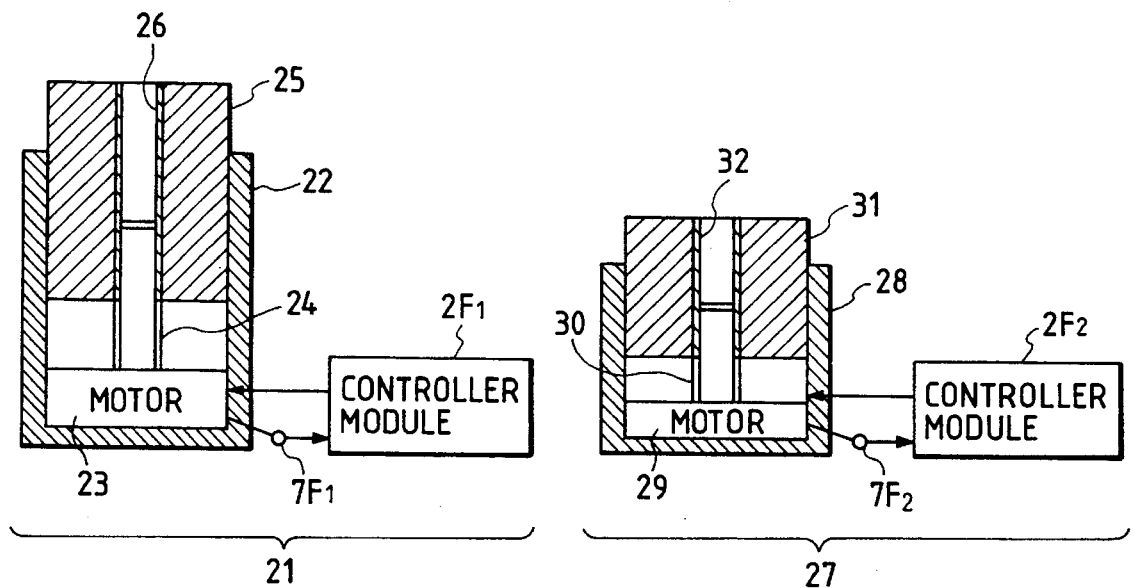
FIG. 24 is a view illustrating how the servo cylinders 21 and 27 in FIG. 16 are disconnected from each other.
Figure 25:
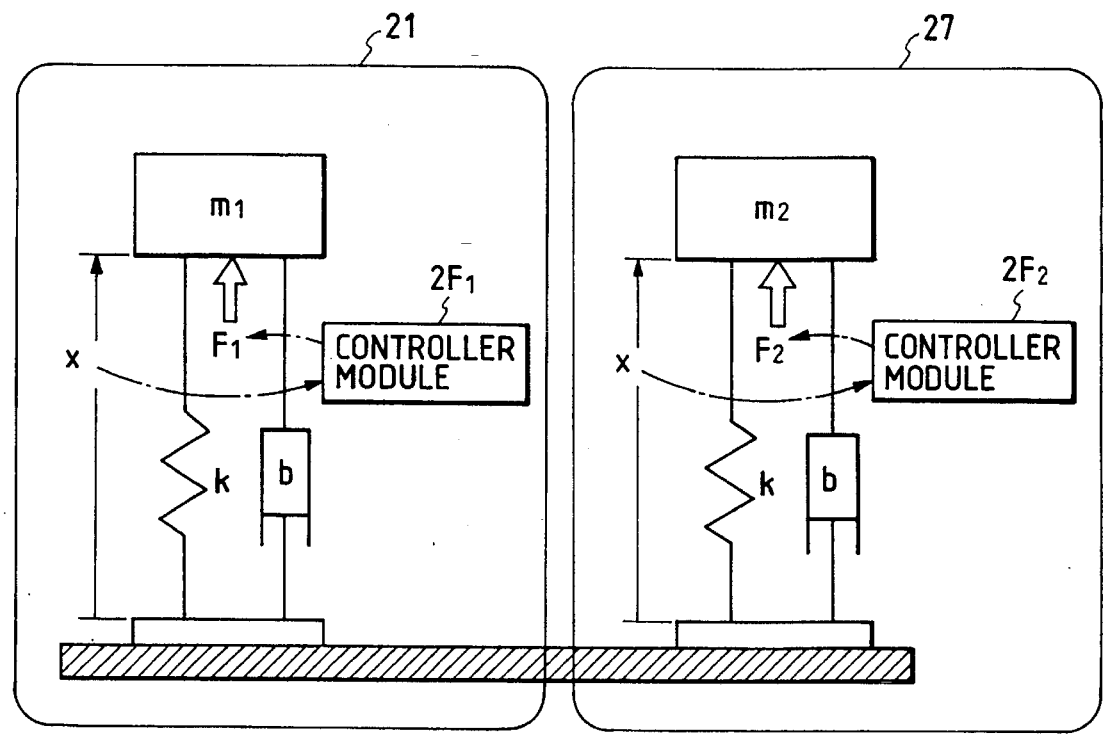
FIG. 25 is a view showing a dynamic model of the setup in FIG. 24.

FIG. 24 shows how the servo cylinders 21 and 27, combined in FIG. 16, are separated from each other. In the setup of FIG. 16, the servo cylinders 21 and 27 are combined so that the change in the system variable regarding the servo cylinder 21 affects the change in the system variable regarding the servo cylinder 27. By contrast, in the setup of FIG. 24, the changes in the system variables relevant to the servo cylinders 21 and 27 do not interfere with each other. This makes it possible for the independent controller 3F$_1$ of the controller module 2F$_1$ to control the motor 23 independently of the independent controller 3F$_2$ of the controller module 2F$_2$ controlling the motor 29. FIG. 25 is a view showing a dynamic model of the servo cylinder system in FIG. 24. Suppose that the state of FIG. 24 changes into that of FIG. 16. The state of FIG. 16, in which the two servo cylinders are directly coupled, causes interference between the system variables involved as described. That is, dynamic interference occurs between the two directly coupled servo cylinders. In this case, the adjuster adjusts the gain of the cooperative controller as discussed in connection with the embodiment of FIG. 1; the kind of control based on the cooperative control rule with the gain adjusted becomes necessary.

If x$_i$ represents the system variable of the target system controlled by a given controller module, the independent controller of that current module obtains a independent control signal u$_{ii}$ by computing the function of the independent control rule of equation (10):

$$u_{ii} = -g_i x_i \tag{10}$$

where, g$_i$ stands for a independent control gain vector. If x$_j$ represents the system variable of the target system controlled by another module, the cooperative controller acquires a cooperative control signal u$_i$ by computing on the function of the cooperative control rule of equation (11):

$$u_{ij} = -g_j x_j \tag{11}$$

where, g$_j$ is a cooperative control gain vector.

The adjusting algorithm of the adjuster (see FIG. 2) involves adjusting the above gain vector g$_j$ so as to optimize on-line the evaluation function of the cooperative controller relevant to the control response of the current module. For adjustment, random search is performed in order to vary the increment of the gain randomly and to see what happens (step 9 in FIG. 2). The increment of the gain is selected by a multiplicative method because the order of each of the components of the gain vector is difficult to predict. For example, the multiplicative method may commonly increase values of, say, 0.1 and 10.0 by a gain increment of 10%, whereas an additive method for the 10% gain increment requires setting an increment of 0.01 for the value 0.1, and separately 1.0 for 10.0. That is, the additive method requires complicated procedures for determining individual gain increments. Another advantage of the multiplicative method is that a wide range of adjustments is made available relatively quickly by continuously increasing or decreasing the gain at a certain rate. One drawback of the multiplicative method is that the gain, as it is increased or decreased starting from a positive (or negative) initial value, never become a value of the opposite sign. This drawback is circumvented as follows. Each of the components constituting the gain vector is defined as the difference between a positive and a negative parameter. These gain parameters P$_n$ (twice as many as the components of the vector g$_j$) are each set initially to 1.0 for separate multiplicative adjustments. The search algorithm is then provided as follows:

(1) An evaluation time width T is established. If k denotes the step indicating the number of times evaluation is performed, the evaluated value V(k) is calculated on the basis of the control response of x$_i$ over a time period of (t−T) through t. The gain parameters are updated in synchronism. The smaller the evaluated value, the better. A suitable minimum evaluated value Vopt taken as the initial value and the gain parameter P$_n$-opt in effect at that time need to be recorded.

(2) If the evaluated value V(k) in a given evaluation step k is smaller than the value Vopt, the value Vopt and the gain parameter P$_n$-opt are replaced respectively by the values P$_n$(k) and V(k) currently in effect. The gain parameter is then increased or decreased by the same rate as in the last time to generate P$_n$(k+1). If the check in step 11 of FIG. 1 detects no improvement in the control response, each gain parameter is increased or decreased independently by a rate randomly determined within a certain range. That is, a random number is generated within the range of −d through d. The parameter Pn is then changed using the randomly generated number as the rate of increment or decrement.

The variable width d of the rate of increment or decrement is dependent on the evaluation function value V. For example, the evaluation function value for the control response of a given controller module operating stand-alone is taken as the reference. When the control response is improved up to that reference, the rate of gain increment or decrement is set to zero; when the control response is greater than the reference, the rate of gain increment or decrement is increased proportionately. The variable width d is subject to an upper limit (e.g., 0.2).

The system as a whole including the object positioning device to which the control system 1F of the invention is applied has the system variables $x_1$, $x_2=d(x_1)/dt$ $x_3$, $x_4=(x_3)/t$. Thus when the object positioning device is in the state of FIG. 24 (i.e., cylinders separated), the state equation involved is given by equation (12) described later.

When the object positioning device is in the state of FIG. 16 (i.e., cylinders combined), the state equation involved is given by equation (13) described later.

Coupling the separated two servo cylinders in the object positioning device produces a considerable difference between the state equations involved. This leads to a degraded control characteristic.

$$\frac{d}{dt}\begin{bmatrix}x_1\\x_2\\x_3\\x_4\end{bmatrix}=\begin{bmatrix}0&1&0&0\\-\frac{k_1}{m_1}&-\frac{b_1}{m_1}&0&0\\0&0&0&1\\0&0&-\frac{k_2}{m_2}&-\frac{b_2}{m_2}\end{bmatrix}\begin{bmatrix}x_1\\x_2\\x_3\\x_4\end{bmatrix}+\begin{bmatrix}0&0\\\frac{1}{m_1}&0\\0&0\\0&\frac{1}{m_2}\end{bmatrix}\begin{bmatrix}F_1\\F_2\end{bmatrix} \quad (12)$$

$$\frac{d}{dt}\begin{bmatrix}x_1\\x_2\\x_3\\x_4\end{bmatrix}=\begin{bmatrix}0&1&0&0\\-\frac{k_1}{m_1}&-\frac{b_1}{m_1}&\frac{k_2}{m_1}&0\\0&0&0&0\\\frac{k_1}{m_1}&\frac{b_1}{m_1}&-\frac{k_2}{m_1}&-\frac{k_2}{m_2}\end{bmatrix}\begin{bmatrix}x_1\\x_2\\x_3\\x_4\end{bmatrix}+\begin{bmatrix}0&0\\\frac{1}{m_1}&0\\0&0\\-\frac{1}{m_1}&\frac{1}{m_2}\end{bmatrix}\begin{bmatrix}F_1\\F_2\end{bmatrix} \quad (13)$$

The variables used in equations 12 and 13 take the following values $m_1=m_2=1$, $k_1=9$, $k_2=4$, $b_1=b_1=0.1$. When these equations (12) a (13) are supplemented by additionally defined system variables $x_5$ (=(integral of the deviation of $x_1$)) and $x_6$ (=(integral of the deviation of $x_3$)) of deviation integrals, the independent control rule used by the independent controller $3F_1$ of the controller module $2F_1$ to acquire the independent control signal $u_{11}$ is given by equation (14).

$$u_{11} = [P0\ P1\ P2]\begin{bmatrix}x_1\\x_2\\x_3\end{bmatrix} \quad (14)$$

where, P0, P1 and P2 are fixed to 19, 6 and 4, respectively. The equation (14) is equivalent in nature to PID control.

The cooperative control rule $u_{12}$ used by the cooperative controller $4F_1$ of the controller module $2F_1$ to obtain the cooperative control signal $u_1$ is given by equation (15) using the system variables $x_3$, $x_4$ and $x_6$ sent from the controller module $2F_2$.

$$u_1 = u_{12} = -[P4-P3\quad P6-P5\quad P8-P9]\begin{bmatrix}x_3\\x_4\\x_6\end{bmatrix} \quad (15)$$

The cooperative control parameters P3 through P8 vary on-line starting from the initial value of 1.0 to reach suitable values through random search. Equation (16) below represents the evaluation function $V_1$ used by the adjuster $5F_1$ to judge an improvement in the response in step 11 of FIG. 2.

$$V_1(k) = \frac{1}{T}\int_{t=(k-1)T}^{t=kT}\sqrt{(x_1(t)-\text{Reference value})^2 + (x_2(t))^2}dt \quad (16)$$

As indicated, the system variables sent from the controller module $2F_2$ are used to improve the egoistic control response of the controller module $2F_1$. Equation (17) below defines the variable width $d_1$ of the rate of increment or decrement for the random search in adjusting the parameters P3 through P8, the definition being based on the evaluated value of 0.25 in effect when the servo cylinders 21 and 27 of the object positioning device are separated as shown in FIG. 24.

$$d_1(k)=\min\{2.0(V_1(k)-0.25),\ 0.2\} \quad (17)$$

Likewise, equation (18) below defines the control rule and adjusting algorithm used by the independent controller $3F_2$, cooperative controller $4F_2$ and adjuster $5F_2$ of the controller module $2F_2$. As such, equation (18) represents the independent control rule corresponding to the PID action effected by the independent controller $3F_2$.

$$u_{22} = [P10\ P11\ P12]\begin{bmatrix}x_3\\x_4\\x_6\end{bmatrix} \quad (18)$$

where, P10, P11 and P12 are fixed to 23, 6 and 4, respectively.

The cooperative control rule used by the cooperative controller $4F_2$ for its operation is defined by equation (19).

$$u_2 = u_{21} = -[P14-P13\quad P16-P15\quad P18-P17]\begin{bmatrix}x_3\\x_4\\x_6\end{bmatrix} \quad (19)$$

Equation (20) below defines the evaluation function for the controller module 2F2 used by the adjuster 5F2.

$$V_2(k) = \frac{1}{T}\int_{t=(k-1)T}^{t=kT}\sqrt{(x_3(t)-\text{Reference value})^2 + (x_4(t))^2}dt \quad (20)$$

Equation (21) below defines the variable width d2 of the rate of increment or decrement for the random search in adjusting the parameters P13 through P18, the definition being based on the evaluated value of 0.3 in effect when the servo cylinders 21 and 27 of the object positioning device are separated as shown in FIG. 24.

$$d_2(k)=\min\{2.0(V_2(k)-0.30),\ 0.2\} \quad (21)$$

Figure 19:
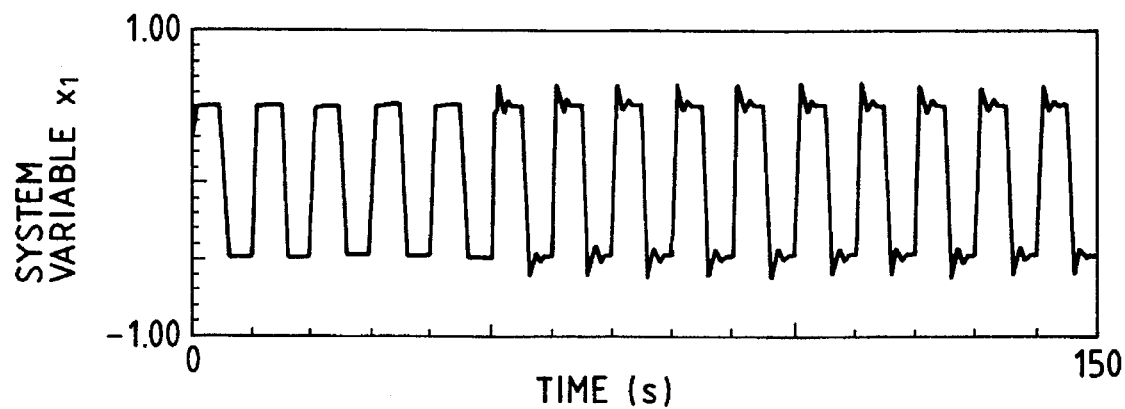
FIG. 19 is a graphic representation of the control response in the typical conventional independent control setup.
Figure 20:
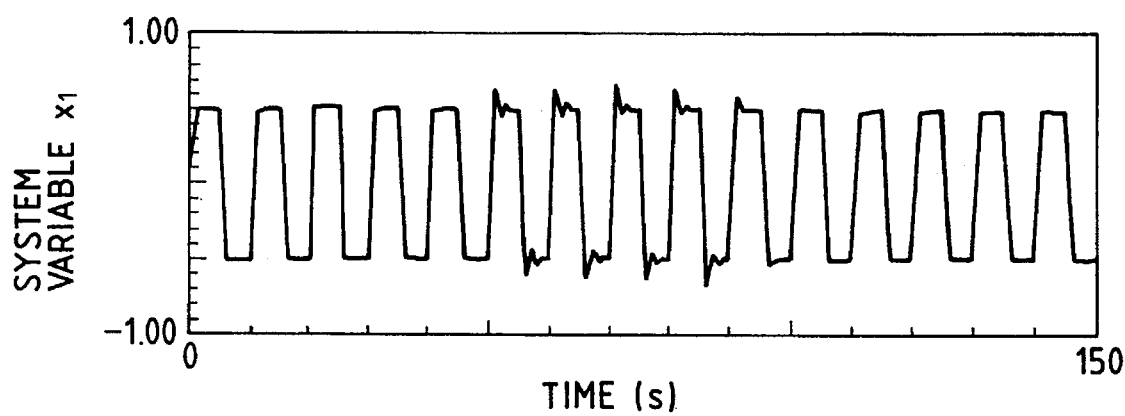
FIG. 20 is a graphic representation of the control response of the control system in FIG. 18.

FIGS. 19 and 20 are graphic representations of the control responses given by the controller modules constituted as described above. As illustrated, the control responses plot the displacements $x_1$ and $x_3$ of the servo cylinders 21 and 27, respectively, upon receipt of reference values given at intervals of 10 seconds in a square waveform pattern. FIG. 19 shows the control response of the typical conventional independent control setup. Under conventional independent control, the servo cylinders 21 and 27 are used separated as shown in FIG. 24, each of the cylinders being controlled separately using the independent controller of the above-described constitution. FIG. 20 depicts the control response in effect when the control system 1F of the invention having the independent and cooperative controllers is allowed to function. In each of the two cases, the servo cylinders 21 and 27 leave their separated state to become combined 50 seconds after the start of their operation.

Figure 21:
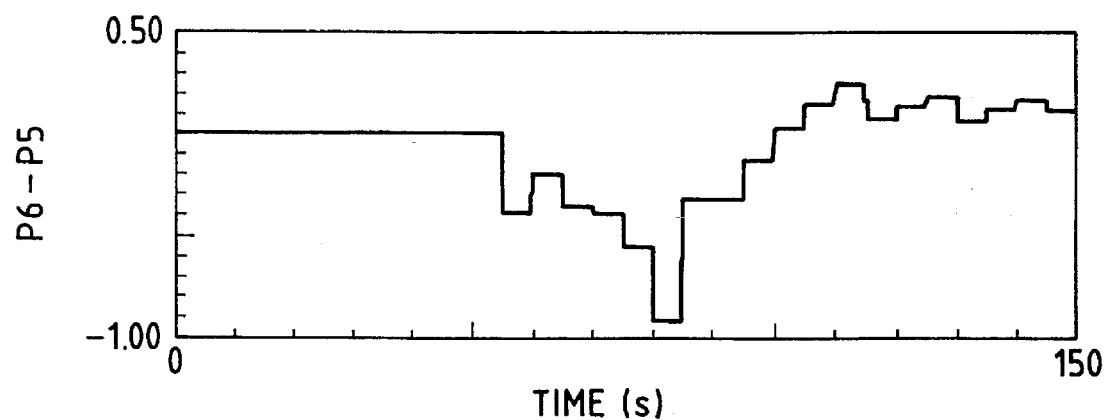
FIG. 21 is a graphic representation of the changes stemming from adjusting the gain (P6–P5) of the cooperative controller in FIG. 18.
Figure 22:
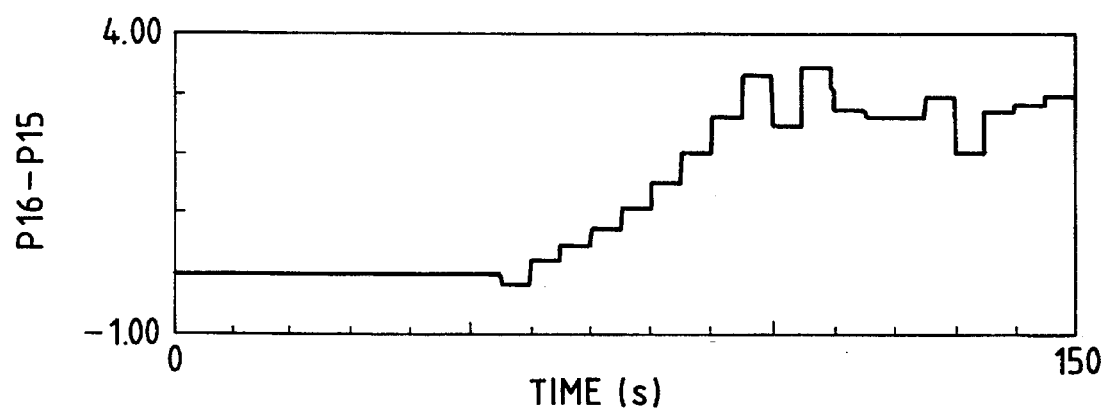
FIG. 22 is another graphic representation of the changes stemming from adjusting the gain (P16–P15) of the cooperative controller in FIG. 19.

In the conventional independent control setup of FIG. 19 (equivalent to PID control), dynamic interference between the servo cylinders 21 and 27 produces a degradation in the control response the moment the two cylinders are connected and the degradation continues. By contrast, when the control system 1F of the this embodiment is in operation, the independent and cooperative controllers of the control system 1F are activated quickly to improve the temporarily degraded control response. A time width T of 5 seconds is needed to allow for the evaluation of the control response by the adjuster and for the gain adjustment by the cooperative controller. The control response is in synchronism with the square waveform pattern given as the reference values. FIG. 21 plots the changes stemming from adjustment of the typical gain (P6–P5) in Equation (15) by the cooperative controller $4F_1$, and FIG. 22 plots the changes stemming from adjustment of the typical gain (P16–P15) in Equation (19) by the cooperative controller $4F_2$. In each case, the changes start 50 seconds into the adjustment and they settle down to an approximately constant level 150 seconds later.

Figure 26:
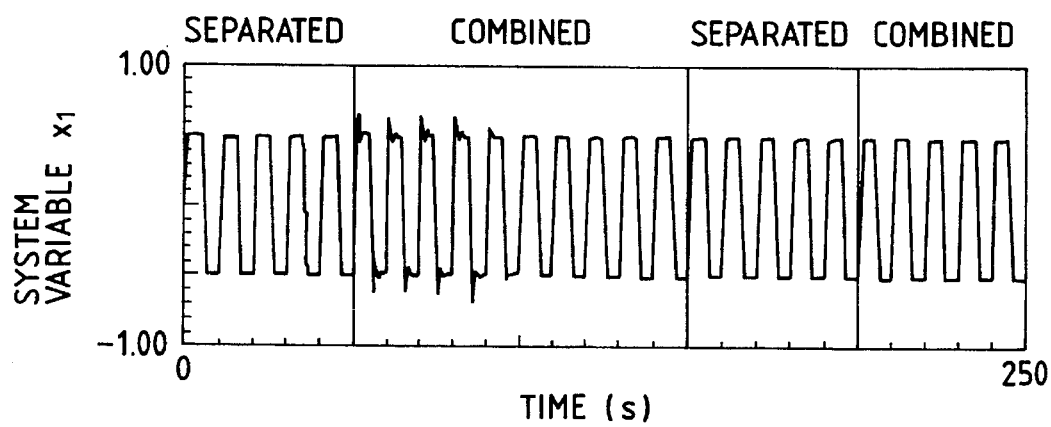
FIG. 26 is a graphic representation of the changes in the system variable x1 in effect when the two servo cylinders of FIG. 16 are connected and disconnected to and from each other repeatedly.
Figure 27:
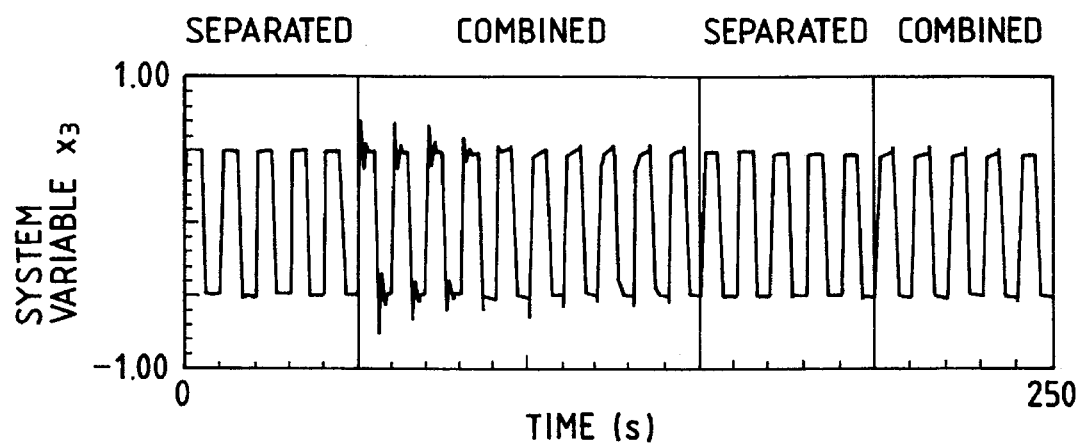
FIG. 27 is a graphic representation of the changes in the system variable x3 in effect when the two servo cylinders of FIG. 16 are connected and disconnected to and from each other repeatedly.

FIGS. 26 and 27 plot the changes in the control response when the servo cylinders 21 and 27 are combined and separated repeatedly. FIG. 26 is a graphic representation of the changes in the system variable $x_1$ of the servo cylinder 21, and FIG. 27 is a graphic representation of the changes in the system variable $x_3$ of the servo cylinder 27. Once the gain of the cooperative controller is adjusted upon initial combination of the servo cylinders, a good response is immediately reached and maintained in the subsequent instances of combination and separation.

Figure 23:
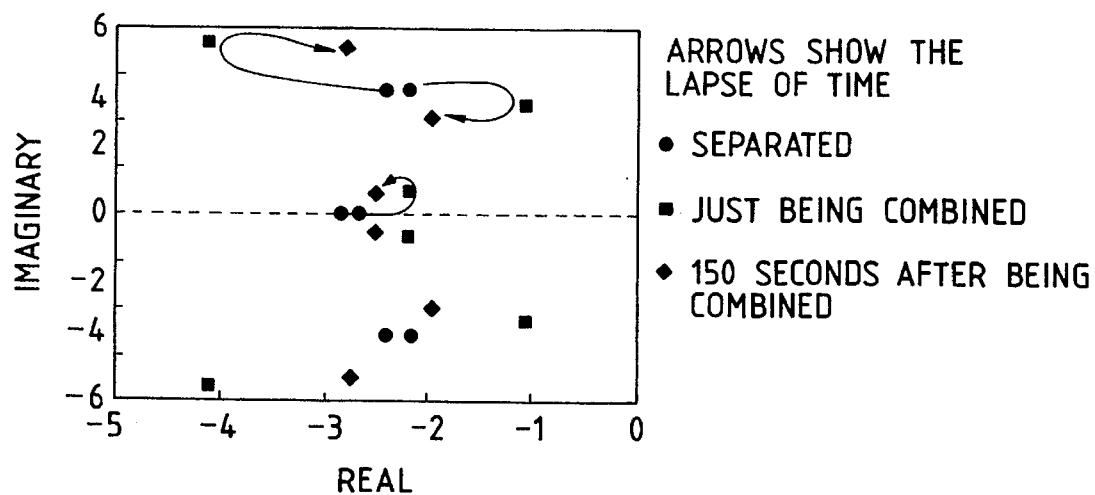
FIG. 23 is a graphic representation showing effects of the embodiment of FIG. 16.

FIG. 23 is a graphic representation showing effects of this embodiment of FIG. 16. There appear obvious improvements in the control response waveform obtained by the embodiment. To evaluate the improvements quantitatively, the characteristic values of the object positioning device as a whole may be examined. The system has six characteristic values because the system is a sextic system. In FIG. 23, the characteristic values of the system as a whole are given in three states of the system workings: a state in which the servo cylinders 21 and 27 are separated (less than 50 seconds after the start of operation); another state in which the servo cylinders 21 and 27 are combined for the first time (50 seconds later); and another state in which the system has operated for 150 seconds. Since half of the characteristic values are complex conjugate roots, only the upper half portion of FIG. 23 need to be examined. In FIG. 23, the characteristic values vary over the arrowed passage of time. What is evident from FIG. 23 is that the characteristic values of PID control in effect with the servo cylinders 21 and 27 separated vary significantly immediately after the start of the system interaction, the values returning subsequently close to the initial values through the self-organization based on the cooperative control rule.

The control system 1F of the above-described embodiment thus offers the same effects and benefits as the embodiment of FIG. 1.

Figure 28:
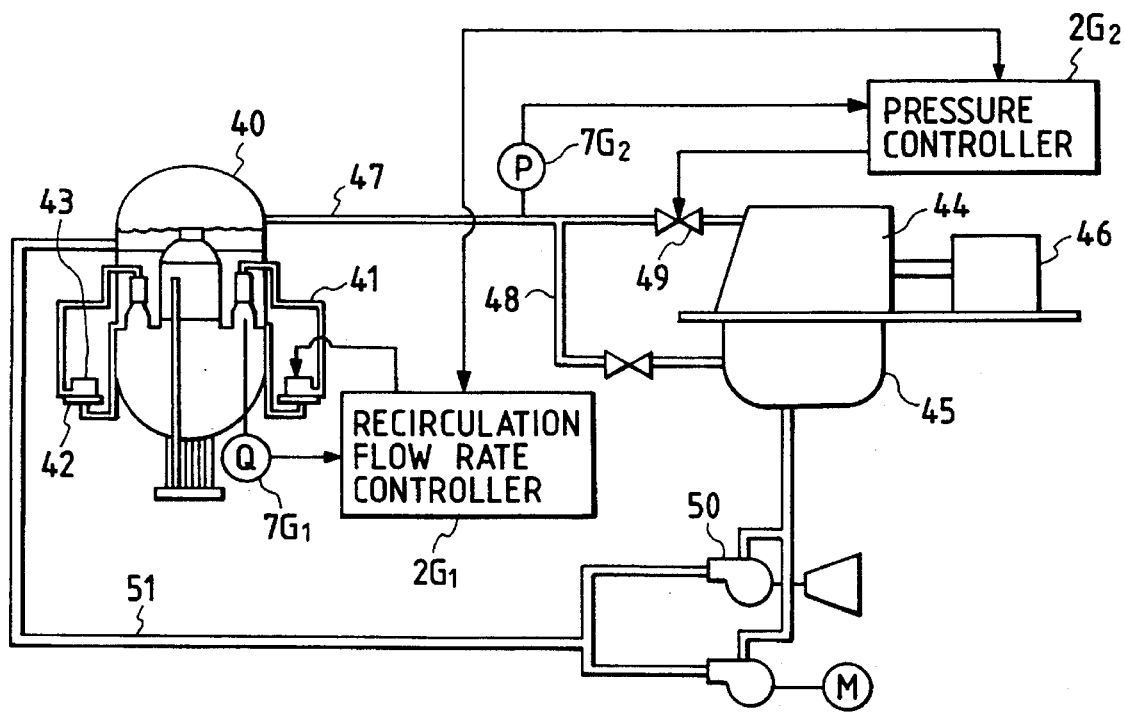
FIG. 28 is a schematic view of a control system embodying the invention, the system controlling a boiling water reactor plant.
Figure 29:
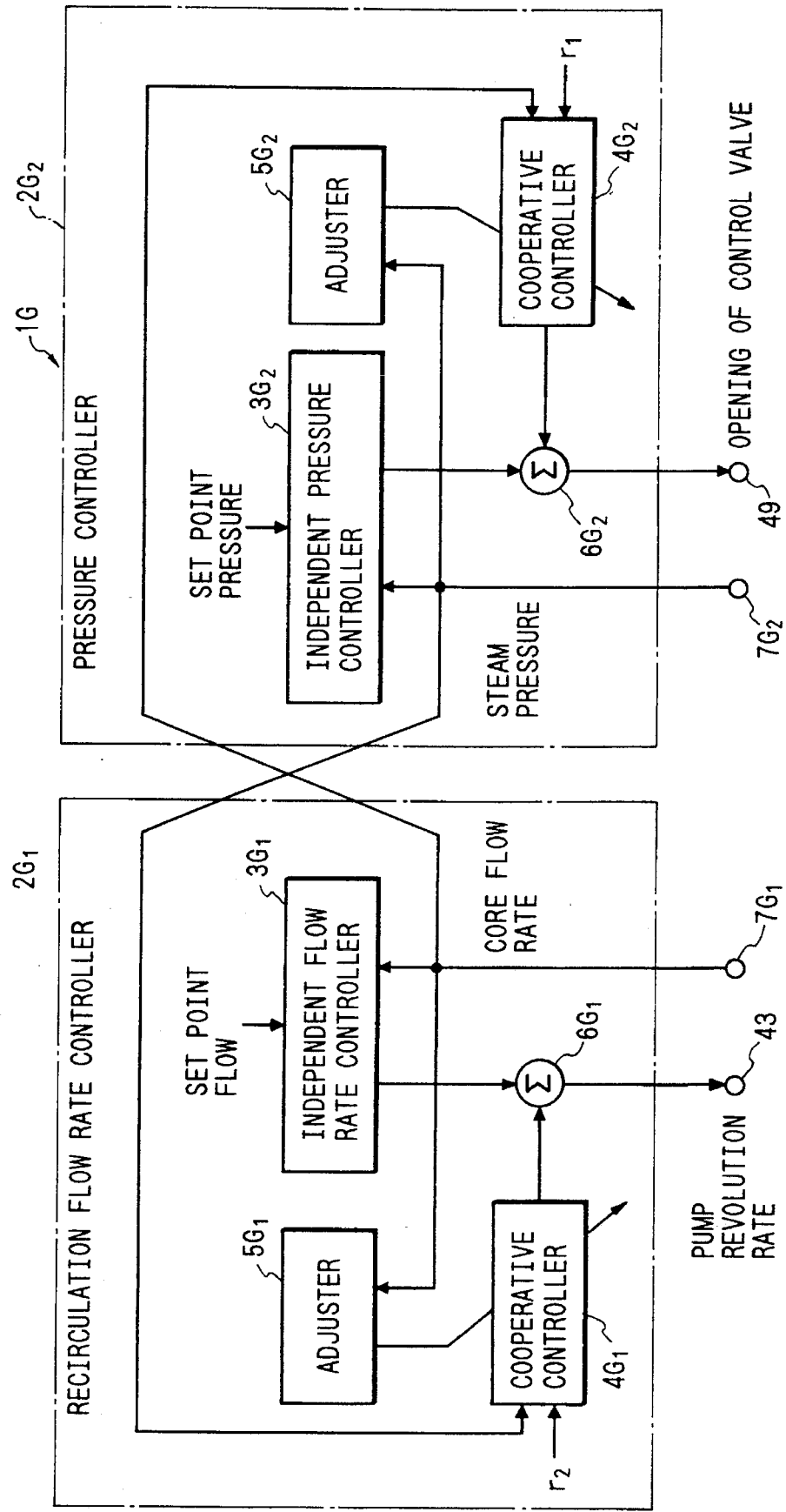
FIG. 29 is a block diagram of the control system in FIG. 28.

Described below with reference to FIGS. 28 and 29 is how the control system of the invention is applied illustratively to a boiling water reactor plant, i.e., a typical nuclear power plant. First, the BWR plant is outlined below by referring to FIG. 28. The steam generated by a nuclear reactor 40 is guided to a turbine 44 past a main steam pipe 47 equipped with a control valve 49. The steam is condensed into water by a condenser 45. The condensed water is pressured by a water supply pump 50 and sent as coolant back to the nuclear reactor 40 via a water supply pipe 51. A generator 46 is coupled to the turbine 44. A recirculation pump 42 is driven by a motor 43 to supply coolant to the reactor core in the nuclear reactor 40. The BWR plant of this constitution includes a recirculation flow rate controller $2G_1$ and a pressure controller $2G_2$. The recirculation flow rate controller $2G_1$ controls the core flow rate as follows. The flow rate of the coolant fed to the reactor core (i.e., core flow rate) is measured by a flow meter $7G_1$. In accordance with the core flow rate thus measured, the revolutions of the motor 43 are controlled. Controlling the motor 43 in rotating speed adjusts the recirculation flow rate at the recirculation pump 42. That in turn controls the core flow rate. The increase of the core flow rate increases the power of the nuclear reactor. The decrease of the core flow rate decreases the power of the nuclear reactor. In this manner, the recirculation flow rate controller $2G_1$ controls the core flow rate, i.e., the power of the nuclear reactor. The pressure controller $2G_2$ controls the opening of the control valve 49 based on the main steam pressure measured by a pressure gauge $7G_2$, so as to keep the pressure of the nuclear reactor at a predetermined level.

The control system 1G as embodied in FIG. 28 is described with reference to FIG. 29. The control system 1G comprises the recirculation flow rate controller $2G_1$ and the pressure controller $2G_2$, both acting as controller modules. The recirculation flow rate controller $2G_1$ includes a independent flow rate controller $3G_1$ (i.e., independent controller), a cooperative controller $4G_1$, an adjuster $5G_1$ and a synthesizer $6G_1$. The pressure controller $2G_2$ has a independent flow rate controller $3G_2$ (independent controller), a cooperative controller $4G_2$, an adjuster $5G_2$ and a synthesizer $6G_2$. The core flow rate (i.e., system variable $x_1$) measured by the flow meter $7G_1$ is input to the independent flow rate controller $3G_1$, to the adjuster $5G_1$ and to the cooperative controller $4G_2$. The synthesizer $6G_1$ outputs a control signal $U_1$, which is used to control the revolutions of the motor 43. The main steam pressure (i.e., system variable $x_2$) measured by the pressure gauge $7G_2$ is input to the independent flow rate controller $3G_2$, to the adjuster $5G_2$ and to the cooperative controller $4G_1$. The synthesizer $6G_2$ outputs a control signal $U_2$, which is used to control the revolutions of the motor 43. In this embodiment, the recirculation pump 42 may be replaced with an internal pump. The recirculation pump 42 and the internal pump each act as a device that supplies the reactor core with coolant.

In the BWR plant of the above constitution, if the recirculation flow rate controller 2G1 increases the core flow rate to be increased the nuclear reactor power without varying the opening of the control valve 49, the amount of steam generated by the nuclear reactor 40 increases and the nuclear reactor pressure rises accordingly. Since a rise in the nuclear reactor pressure is decreased the void in the reactor core, nuclear reactor power further increases. This phenomenon is avoided by having the pressure controller $2G_2$ regulate the opening of the control valve 49 to reduce the nuclear reactor pressure and to keep it at a predetermined level. If the pressure controller $2G_2$ widens the opening of the control valve 49 with the core flow rate kept constant, the nuclear reactor pressure drops and the amount of the void in the reactor core increases accordingly. When the nuclear reactor power can no longer be kept constant, it becomes necessary for the recirculation flow rate controller $2G_1$ to increase the core flow rate so as to be increased the nuclear reactor power. In this manner, when the recirculation flow rate controller $2G_1$ controls the core flow rate, the main steam pressure (i.e., system variable $x_2$) that is controlled by the pressure controller $2G_2$ is changed. Conversely, when the pressure controller $2G_2$ controls the main steam pressure, the core flow rate (i.e., system variable $x_1$) that is controlled by the recirculation flow rate controller $2G_1$ is changed. Thus the core flow rate and the main steam pressure interfere with each other in terms of change.

The recirculation flow rate controller $2G_1$ has the functions of the controller module 2 in FIG. 1, whereas the pressure controller $2G_2$ has the functions of the controller module 2A in FIG. 1. In other words, the independent flow rate controller $3G_1$, cooperative controller $4G_1$, adjuster $5G_1$ and synthesizer $6G_1$ in the recirculation flow rate controller $2G_1$ are functionally equivalent to the independent controller 3, cooperative controller 4, adjuster 5 and synthesizer 6 in the controller module 2, respectively. Likewise, the flow rate independent controller $3G_2$, cooperative controller $4G_2$, adjuster $5G_2$ and synthesizer $6G_2$ in the pressure controller $2G_2$ are functionally equivalent to the independent controller 3A, cooperative controller 4A, adjuster 5A and synthesizer 6A in the controller module 2A, respectively. Thus in case of the interference mentioned above, the control response of each of the system variables involved can be improved in a short time.

When the BWR plant has started operating and the recirculation flow rate controller $2G_1$ and pressure controller $2G_2$ function for the first time, the adjusters $5G_1$ and $5G_2$ adjust the gains of the cooperative controllers $4G_1$ and $4G_2$, respectively. Otherwise the adjusters $2G_1$ and $2G_2$ adjust the gains of the cooperative controllers $4G_1$ and $4G_2$ illustratively when the reference value $r_1$ of the core flow rate for the flow rate independent controller $3G_1$ is varied for a partial load operation while the nuclear reactor is performing a load follow-up operation. The reference value $r_1$ is varied automatically (or manually from a control panel) by an overall control aparatus of the BWR plant.

The control system 1G of the above-described embodiment in FIG. 29 thus offers the same effects and benefits as the embodiment of FIG. 1.

Figure 30:
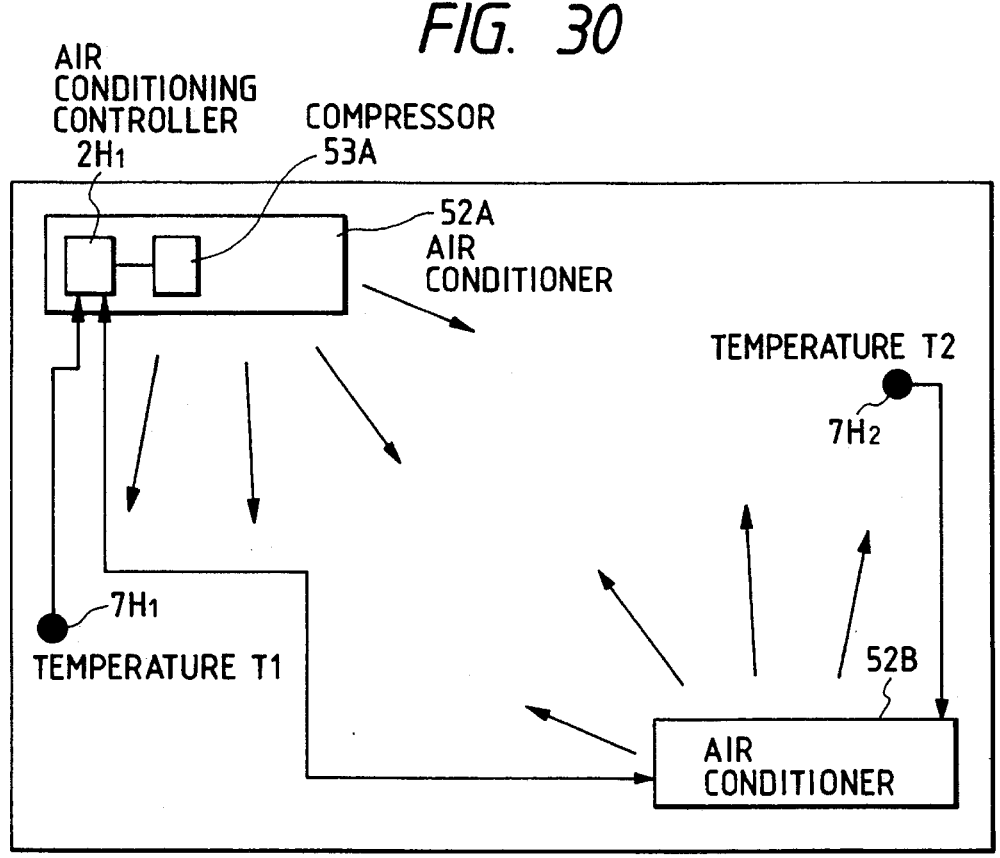
FIG. 30 is a schematic view of a control system embodying the invention, the system controlling an air conditioning system.

A control system 1H, that is, another embodiment of the invention for controlling an air conditioning system is described with reference to FIGS. 30 and 31. This air conditioning system is composed of two air conditioners 52A and 52B installed in one room.

The air conditioner 52A is controlled to maintain a set temperature $r_1$ (i.e., reference value) based on the temperature T1 measured by a temperature sensor $7H_1$ located where illustrated inside the room. The air conditioner 52B is controlled to maintain another set temperature $r_2$ (reference value) in accordance with the temperature T2 measured by a temperature sensor $7H_2$ located where illustrated within the same room. The air conditioners 52A and 52B, installed close to each other in the same room, develop interference between their air flows discharged into the same space.

For example, suppose that the set temperatures $r_1$ and $r_2$ are identical and that the temperature T1 has reached the set temperature $r_1$ while the temperature T2 is considerably lower than the temperature T1. If the air conditioners 52A and 52B are each under independent control, the air conditioner 52A maintains the same output while the air conditioner 52B starts heating. In that case, the temperature T2 starts climbing toward the set temperature $r_2$, only to be accompanied by an unwanted increase in the temperature T1 as well. If such temperature interference is taken into account, a better kind of control in the above setup should be to suppress the heat power of the air conditioner 52A when the temperature T2 has dropped.

The air conditioner 52A incorporates an air conditioning controller $2H_1$ and a compressor 53A for compressing a heat medium. The heat medium discharged by the compressor 53A circulates through the piping inside the air conditioner 52A.

The control system 1H incorporating the air conditioning controller $2H_1$ also has an air conditioning controller $2H_2$. The air conditioning controller $2H_2$ and a compressor 53B controlled by the controller $2H_2$ are furnished in the air conditioner 52B. The air conditioning controller $2H_1$ controls the compressor 53A.

Figure 31:
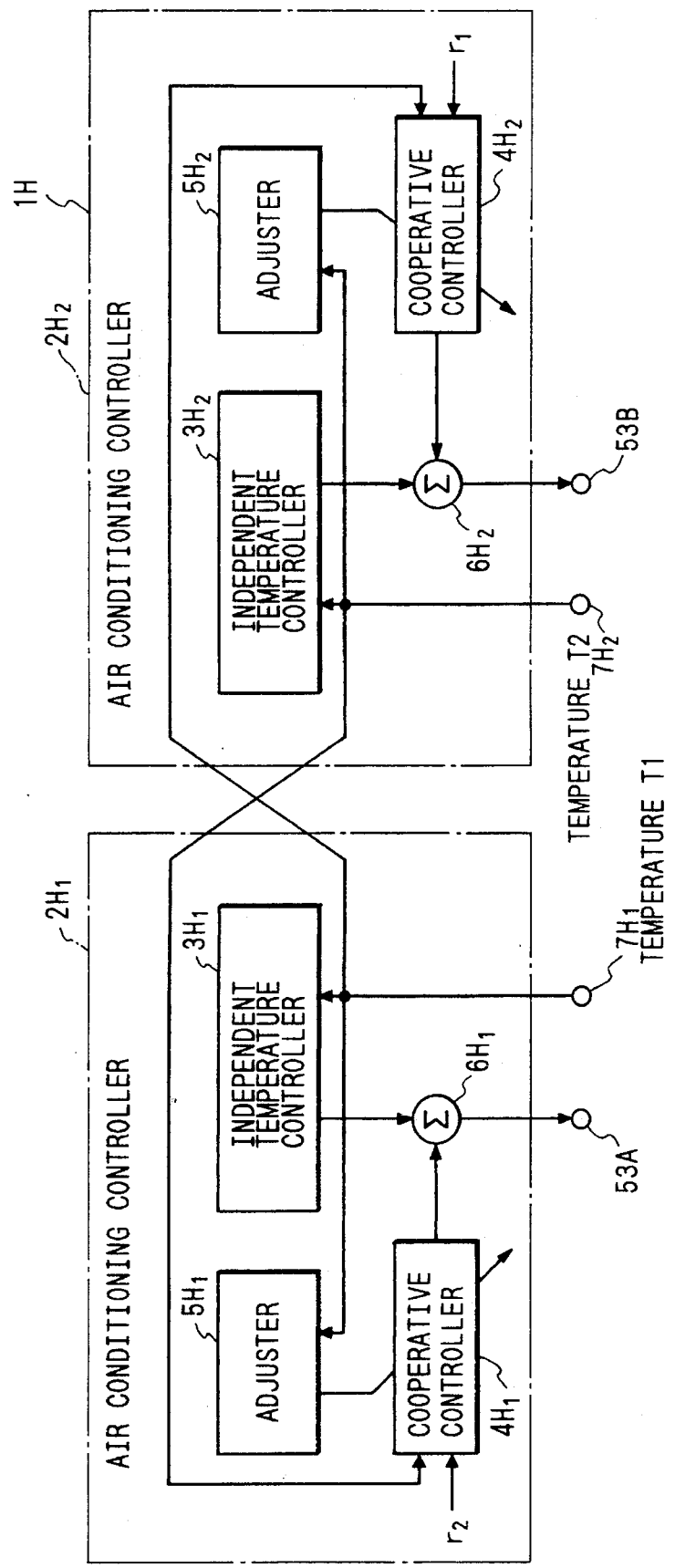
FIG. 31 is a block diagram of the control system in FIG. 30.

The air conditioning controllers $2H_1$ and $2H_2$ are constituted as shown in FIG. 31. The air conditioning controller $2H_1$ is a controller module that contains a independent temperature controller $3H_1$ (i.e., independent controller), a cooperative controller $4H_1$, an adjuster $5H_1$ and a synthesizer $6H_1$. The air conditioning controller $2H_2$ is a controller module that includes a independent temperature controller $3H_2$ (independent controller), a cooperative controller $4H_2$, an adjuster $5H_2$ and a synthesizer $6H_2$. The temperature T1 (i.e., system variable $x_1$) measured by the temperature sensor $7H_1$ is input to the independent temperature controller $3H_1$, to the adjuster $5H_1$ and to the cooperative controller $4H_2$. The revolutions of the compressor 53A are controlled on the basis of the control signal $U_1$ output from the synthesizer $6H_1$. The temperature T2 (i.e., system variable $x_2$) measured by the temperature sensor $7H_2$ is input to the independent temperature controller $3H_2$, to the adjuster $5H_2$ and to the cooperative controller $4H_1$. The revolutions of the compressor 53B are controlled on the basis of the control signal $U_2$ output from the synthesizer $6H_2$. The temperature of the heat medium in the air conditioner 52A and that in the air conditioner 52B vary depending on the revolutions of the compressors 53A and 53B. That in turn changes the temperatures of the air flows coming out of the air conditioners 52A and 52B.

The independent temperature controller $3H_1$ inputs the deviation between the measured value and the reference value $r_1$ of the temperature T1, and controls the revolutions of the compressor 53A so as to eliminate that deviation. The cooperative controller $4H_1$ inputs the measured value of the temperature T2 and the reference value $r_2$ for the independent temperature controller $3H_2$, and controls the revolutions of the compressor 53A in based on the cooperative control rule defined as a function of the deviation between the measured value and the reference value $r_2$ of the temperature T2. The adjuster $5H_1$ adjusts in the manner described the gain of the cooperative control rule stored in the cooperative controller $4H_1$. Meanwhile, the independent temperature controller $3H_2$ of the air conditioning controller $2H_2$ controls the revolutions of the compressor 53B so as to eliminate the deviation between the temperature T2 measured by the temperature sensor $7H_2$ and the reference value $r_2$. The cooperative controller $4H_2$ inputs the measured value of the temperature T1 and the reference value $r_1$ for the independent temperature controller $3H_1$, and controls the revolutions of the compressor 53B based on the cooperative control rule defined as a function of the deviation between the temperature T1 and the reference value $r_1$. The adjuster $5H_1$ adjusts in the manner described the cooperative control rule of the cooperative controller $4H_2$. The adjusters $5H_1$ and $5H_2$ adjust the gains of the cooperative controllers $4H_1$ and $4H_2$ when the number of air conditioners installed in the same room is altered or when the reference value for the air conditioners is changed.

The independent temperature controller $3H_1$, cooperative controller $4H_1$, adjuster $5H_1$ and synthesizer $6H_1$ in the air conditioning controller $2H_1$ are functionally equivalent to the independent controller 3, cooperative controller 4, adjuster 5 and synthesizer 6 in the controller module 2 described earlier, respectively. The component units of the air conditioning controller $2H_2$ are also functionally equivalent to their counterparts of the controller module 2A. Thus in case of the above-described interference, the control response of each of the system variables involved is improved in a short time in the same manner as with the embodiment of FIG. 16.

According to this embodiment of FIG. 31, cooperative control is carried out automatically to eliminate interference among as many air conditioners as may be installed in the same room. If any air conditioner stops or otherwise fails, the measured temperature regarding the failed air conditioner is input to the other air conditioners that are placed under altruistic cooperative control (i.e., the processing of FIG. 3 is performed by the adjuster). This makes up for the functional deficit resulting from the failed air conditioner.

The control system 1H of the above-described embodiment thus provides the same effects and benefits as the embodiment of FIG. 1.

Figure 32:
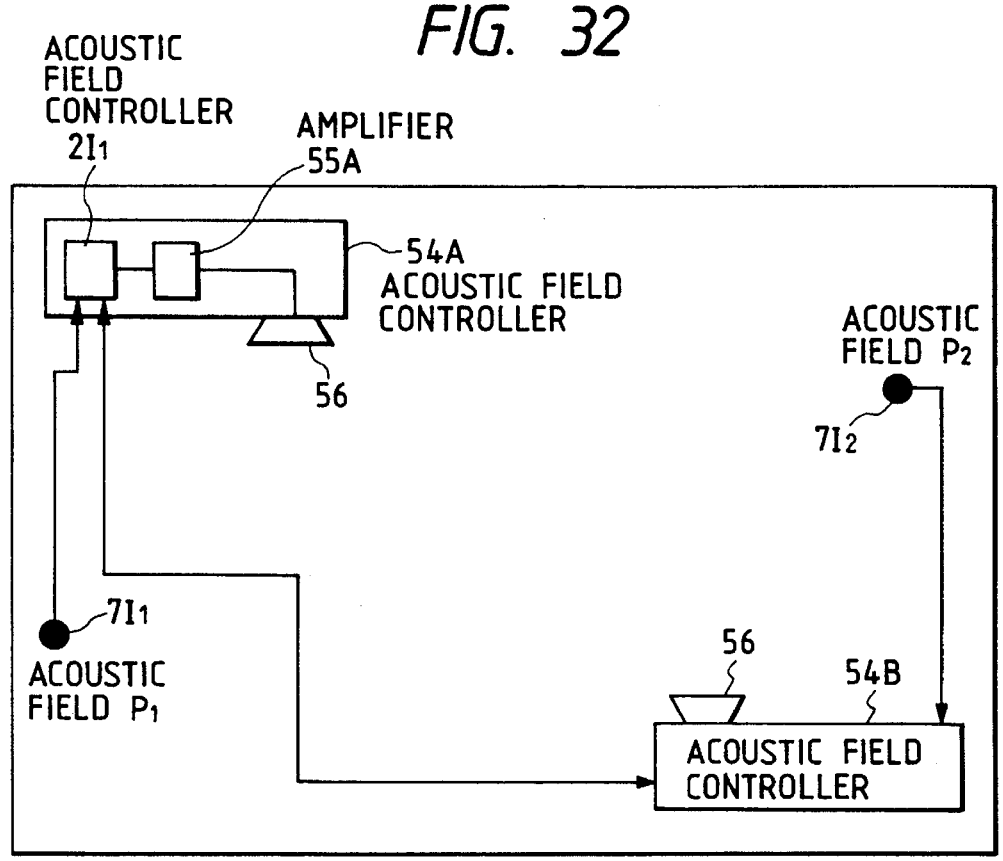
FIG. 32 is a schematic view of a control system embodying the invention, the system controlling an acoustic system.
Figure 33:
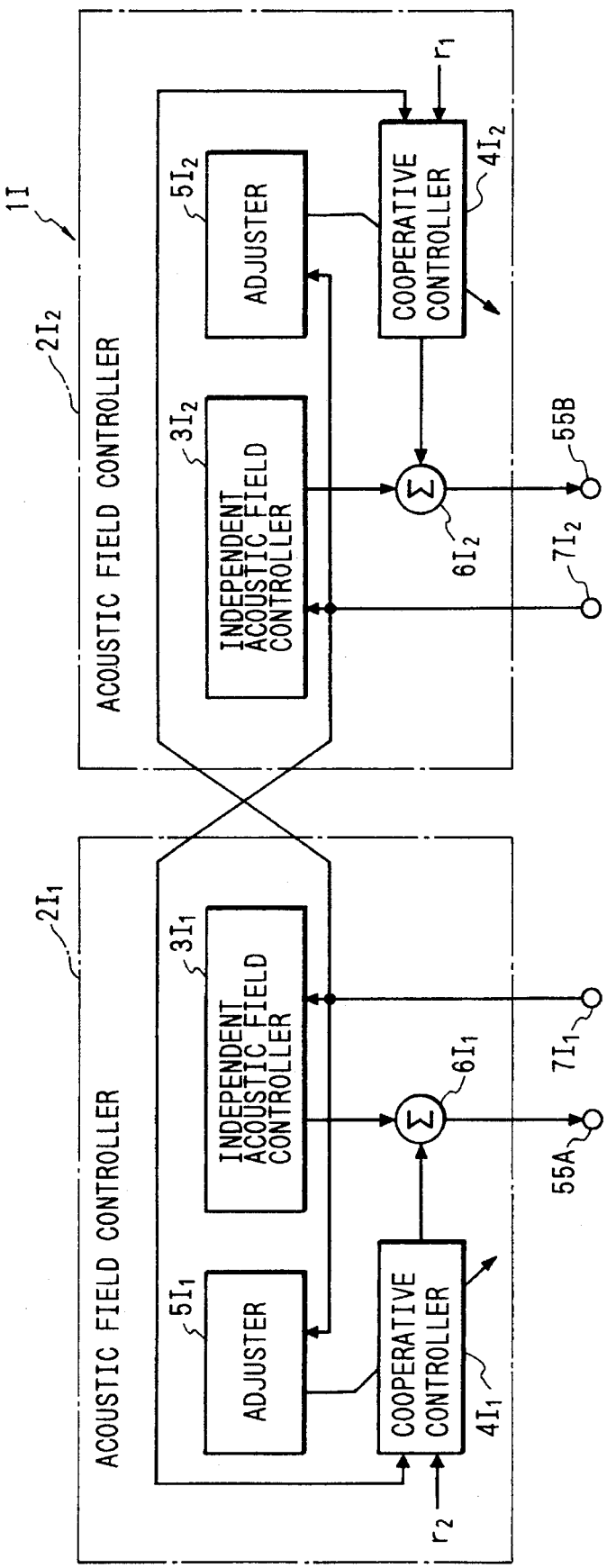
FIG. 33 is a block diagram of the control system in FIG. 32.

FIGS. 32 and 33 show another control system 1I for controlling two acoustic devices 54A and 54B installed in the same room. The acoustic device 54A has an acoustic field controller $2I_1$ (i.e., controller module), an amplifier 55A and a speaker 56. The acoustic device 54B includes an acoustic field controller $2I_2$ (controller module), an amplifier 55B and a speaker 56.

The control system 1I is composed of the acoustic field controllers $2I_1$ and $2I_2$. The acoustic field controller $2I_1$ comprises a independent acoustic field controller $3I_1$ (i.e., independent controller), a cooperative controller $4I_1$, an adjuster $5I_1$ and a synthesizer $6I_1$. The acoustic field controller $2I_2$ includes a independent acoustic field controller $3I_2$ (independent controller), a cooperative controller $4I_2$, an adjuster $5I_2$ and a synthesizer $6I_2$. A acoustic field $P_1$ representing the acoustic energy measured by a sensor $7I_1$ (i.e., system variable $x_1$) is input to the independent acoustic field controller $3I_1$, to the adjuster $5I_1$ and to the cooperative controller $4I_2$. The amplifier 55A is controlled the amplification factor and the phase shift amount based on the control signal $U_1$ output from the synthesizer $6I_1$. This causes the speaker 56 of the acoustic device 54A to output a sound that matches the controlled conditions. A acoustic field $P_2$ representing the acoustic energy measured by a sensor $7I_2$ (i.e., system variable $x_2$) is input to the independent acoustic field controller $3I_2$, to the adjuster $5I_2$ and to the cooperative controller $4I_1$. The amplifier 55B is controlled according to the control signal $U_2$ output from the synthesizer $6I_2$. This causes the speaker 56 of the acoustic device 54B to output a sound that matches the controlled conditions.

Given measurements of the acoustic field from the sensor $7I_1$ located where illustrated, the acoustic field controller 54A controls the acoustic device 54A so that the acoustic field output from the device reaches a reference value $r_1$. The acoustic field controller 54B, using measurements of the acoustic field from the sensor $7I_2$ located where illustrated, controls the acoustic device 54B so that the acoustic field output from the device reaches a reference value $r_2$. In this setup, the two acoustic devices located close to each other in the same room develop interference therebetween. For example, suppose that a acoustic field $P_1$ is what is desired and that a acoustic field $P_2$ is considerably lower than the field $P_1$. With the two acoustic devices under independent control, the acoustic field controller $2I_1$ maintains the same output while the acoustic field controller $2I_2$ enhances its output. This boosts the acoustic field P2 toward the desired level, only to be accompanied by an unwanted rise in the acoustic field $P_1$ as well. Where such interference is taken into account, the output of the acoustic field controller $2I_1$ needs to be reduced when the acoustic field $P_2$ is low.

The independent acoustic field controller $3I_1$ of the acoustic field controller $2I_1$ inputs the acoustic field $P_1$, and outputs the independent control signal which controls the amplification factor and phase shift amount so as to make the acoustic field $P_1$ reach the reference value $r_1$. The cooperative controller $4I_1$ inputs the acoustic field $P_2$, which is the system variable for the another module, and the cooperative control signal which controls the amplifier 55A so as to adjust amplification factor and phase shift amount based on the cooperative control rule defined as a function of the acoustic field $P_2$. The adjuster $5I_1$ suitably adjusts the gain of the cooperative control rule of the cooperative controller $4I_1$ based on the acoustic field $P_1$. The synthesizer $6I_1$ generates the control signal $U_1$ by correcting the independent control signal by the cooperative control signal. The acoustic device 54B also outputs the control signal $U_2$ so as to control the amplifier 55B as the acoustic device 54A.

According to this embodiment of FIG. 33, cooperative control is carried out automatically to eliminate interference among as many acoustic devices as may be installed in the same room. If any acoustic device stops or otherwise fails, the measured acoustic field regarding the failed acoustic device is input to the other acoustic devices that are placed under altruistic cooperative control (i.e., the processing of FIG. 3 is performed by the adjuster). This makes up for the functional deficit resulting from the failed acoustic device.

The control system 1I of the above-described embodiment thus provides the same effects and benefits as the embodiment of FIG. 1.

Figure 34:
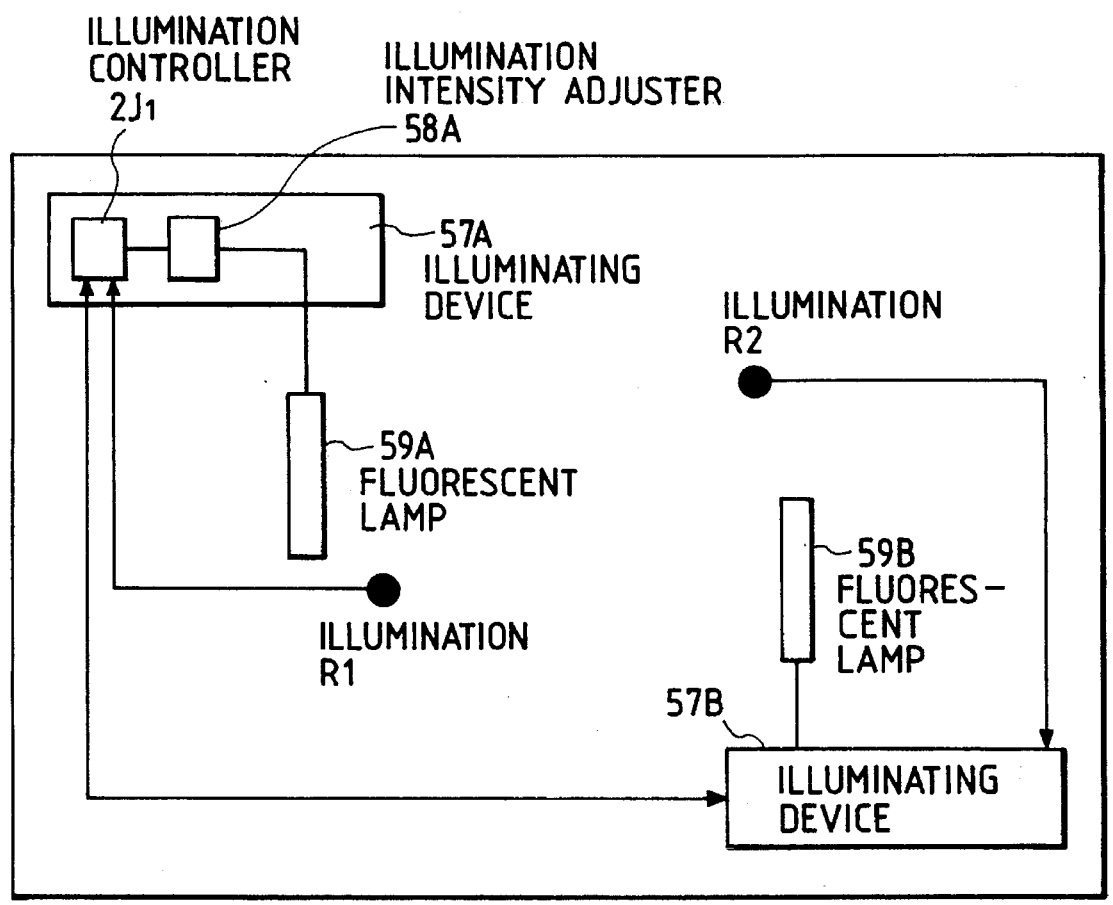
FIG. 34 is a schematic view of a control system embodying the invention, the system controlling an illumination system.
Figure 35:
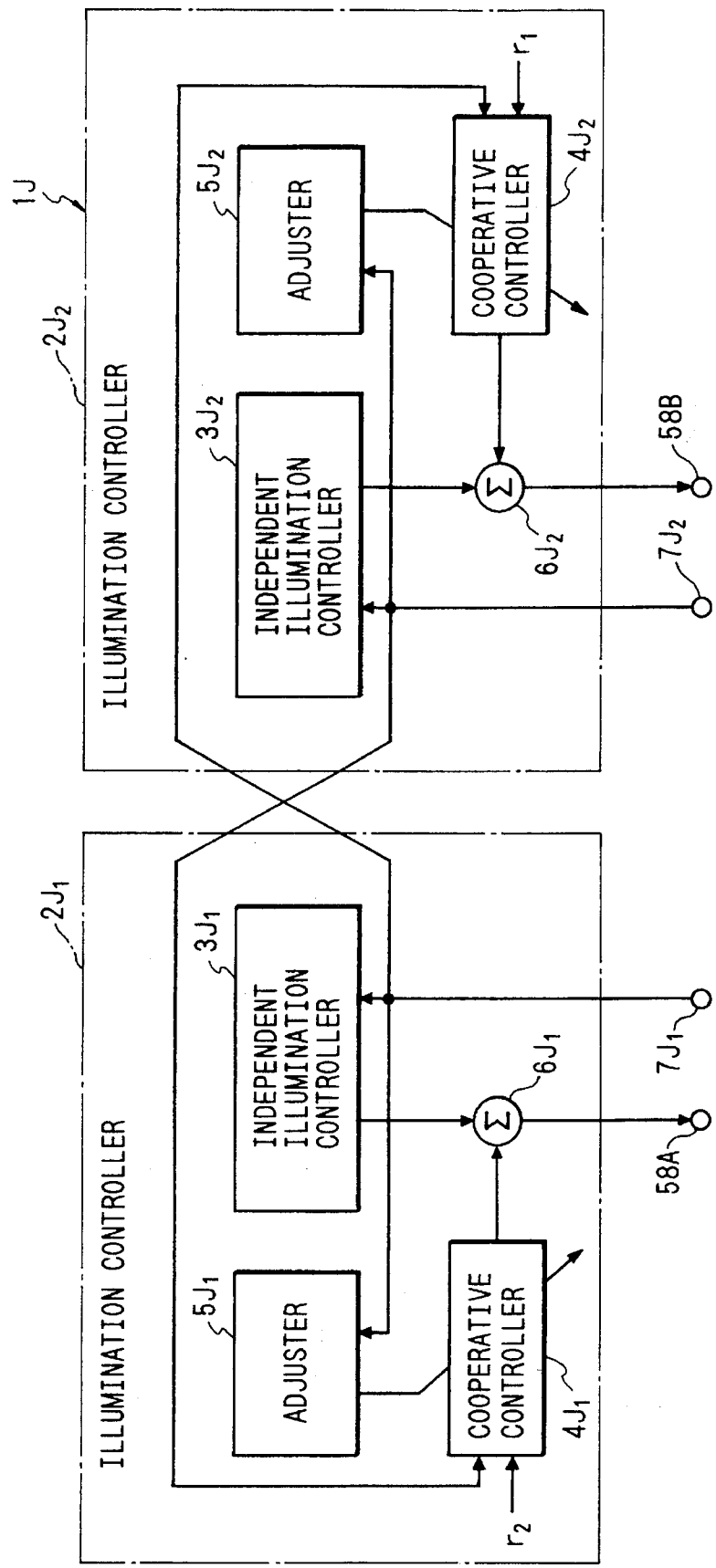
FIG. 35 is a block diagram of the control system in FIG. 34.

FIGS. 34 and 35 show another control system 1J embodying the invention, that is, the system controlling an illumination system. The control system 1J comprises illumination controllers $2J_1$ and $2J_2$. The illumination system is composed of two illumination devices 57A and 57B furnished in one room. Each of the illumination devices contains half of the fluorescent lamps attached to the ceiling of the room.

The illumination device 57A includes the illumination controller $2J_1$, an illumination intensity adjuster 58A and a fluorescent lamp 59A. The illumination device 57B has the illumination controller $2J_2$, an illumination intensity adjuster 58B and a fluorescent lamp 59B.

The illumination controller $2J_1$ comprises an independent illumination controller $3J_1$ (i.e., independent controller), a cooperative controller $4J_1$, an adjuster $5J_1$ and a synthesizer $6J_1$. The illumination controller $2J_2$ includes an independent illumination controller $3J_2$ (independent controller), a cooperative controller $4J_2$, an adjuster $5J_2$ and a synthesizer $6J_2$. The illumination R1 (system variable $x_1$) measured by an illumination meter $7J_1$ is input to the independent illumination controller $3J_1$, to the adjuster $5J_1$ and to the cooperative controller $4J_2$. The illumination intensity adjuster 58A is controlled in accordance with the control signal $U_1$ output from the synthesizer $6J_1$. This adjusts the voltage applied to the fluorescent lamp 59A, whereby the illumination of the lamp 59A is controlled. The illumination R2 (system variable $x_2$) measured by an illumination meter $7J_2$ is input to the independent illumination controller $3J_2$, to the adjuster $5J_2$ and to the cooperative controller $4J_1$. The illumination intensity adjuster 58B is controlled in accordance with the control signal $U_2$ output from the synthesizer $6J_2$. This adjusts the voltage applied to the fluorescent lamp 59B, whereby the illumination of the lamp 59B is controlled.

The illumination device 57A, given the illumination R1 measured by the illumination meter $7J_1$ located where illustrated, is controlled to keep the illumination R1 the predetermined value. Likewise, the illumination device 57B inputs the illumination R2 measured by the illumination meter $7J_2$ located where illustrated and is controlled so as to keep the illumination R2 the predetermined value. The two illumination devices installed close to each other in the same room develop interference therebetween. For example, suppose that the illumination R1 is what is desired and that the illumination R2 is considerably lower than the illumination R1. With the two illumination devices under independent control, the illumination device 57A has the fluorescent lamp 59A maintain the same illumination while the illumination device 57B causes the fluorescent lamp 59B to enhance its illumination. This increases the illumination R2 toward the predetermined level, only to be accompanied by an unwanted rise in the illumination R1 as well. Where such interference is taken into account, the fluorescent lamp 59A of the illumination device 57A needs to be reduced in illumination when the illumination R2 is low.

The independent illumination controller $3J_1$ of the illumination controller $2J_1$ inputs illumination R1, and outputs the independent control signal which controls the illumination intensity adjuster 58A so as to make the illumination R1 reach a reference value $r_1$ based on the deviation between the reference value and the illumination R1 input. The cooperative controller $4J_1$ inputs illumination R2, which is the system variable for the another module, and outputs the cooperative control signal which controls the illumination intensity adjuster 58A. The cooperative controller $4J_1$ generates the cooperative control signal so as to make the illumination R2 reach a reference value $r_2$ based on the cooperative control rule defined as a function of the illumination R2 of the fluorescent lamp 59B. The adjuster $5J_1$ adjusts the gain of the cooperative control rule of the cooperative controller $4J_1$. The synthesizer $6J_1$ generates the control signal $U_1$ by correcting the independent control signal by the cooperative control signal. The illuminating device 57B also outputs the control signal $U_2$ so as to control the illumination intensity adjuster 58B as the illuminating device 57A.

According to this embodiment of FIG. 35, cooperative control is carried out automatically to eliminate interference among as many illumination devices as may be installed in the same room. If any illumination device stops or otherwise fails, the measured illumination regarding the failed illumination device may be input to the other illumination devices that are placed under altruistic cooperative control. This makes up to a certain extent for the functional deficit resulting from the failed illumination device.

The control system 1J of the above-described embodiment thus provides the same effects and benefits as the embodiment of FIG. 1.

Another control system 1K embodying the invention is described with reference to FIG. 36. The control system 1K comprises controller modules $2K_l$ and $2K_2$ that are functionally equivalent to each other while controlling different target systems. The control system may suplement a new controller module controlling a new target system, or the control system may abandon one of its controller modules controlling one of its target systems. In such cases, the controller modules configured are capable of reducing or increasing the system variables based on the new system configuration.

The controller modules are identical in terms of their constitution, which is described. Illustratively, the controller module $2K_1$ comprises a independent controller $3K_1$, a cooperative controller $4K_1$, an adjuster $5K_1$ and a synthesizer $6K_1$. Except for the cooperative controller, the component units of the controller module 2K are functionally equivalent to their counterparts of the controller module 2 in FIG. 1. The synthesizer $6K_1$ generates a control signal $U_i$, which is used to control an target system 8K, by correcting the independent control signal output from the independent controller $3K_1$ by the cooperative control signal output from the cooperative controller $4K_1$. Reference numeral $7K_1$ denotes a sensor.

Figure 36:
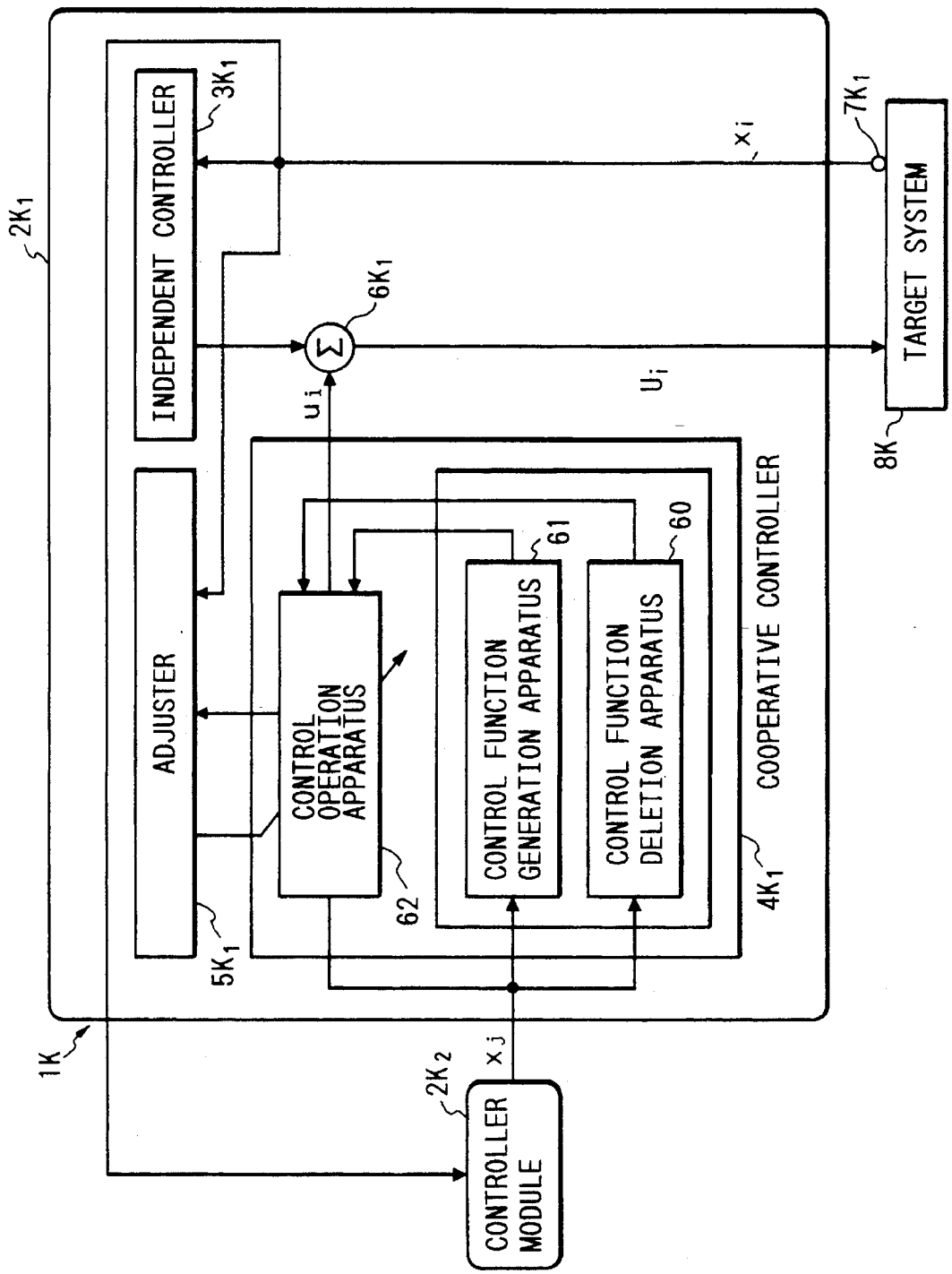
FIG. 36 is a block diagram of another control system embodying the invention.

The cooperative controller $4K_1$ of the embodiment in FIG. 36 includes control function generation apparatus 61, control function deletion apparatus 60 and control computation apparatus 62. The control function generation apparatus 61 and control function deletion apparatus 60 have communication message interpreting means for interpreting communication messages sent from the other module(s) and for checking the message part of the system variable contained in a communication message.

If the communication message interpreting means (not shown) finds that the information input contains a system variable $x_j$ corresponding to a new controller module, then judging means A (not shown) checks to see if the system variable $x_j$ is being input repeatedly. If the system variable $x_j$ is found to be input repeatedly, the control function generation apparatus 61 generates a control function $f_{ij}(x_j)$ corresponding to the system variable $x_j$. The generated control function $f_{ij}(x_j)$ is stored in a memory (not shown) of the control computation aparatus 62. With the number of the stored system variables thus changed, the control computation aparatus 62 informs the adjuster $5K_1$ of that change. At this point, the adjuster $5K_1$ adjusts, according to the system variable $x_i$ of the current module, the gains of the already stored control functions and of the newly added control function in the control computation apparatus 62.

The control function deletion apparatus 60 comprises communication message interpreting means, judging means B and deletion means (not shown). The judging means B checks to see if any of the system variables $x_j$ of the other module(s) interpreted by the communication message interpreting means is interrupted for longer than a predetermined period of time. If such a system variable $x_j$ does exist, the deletion means deletes the control function corresponding to the interrupted system variable from among the control functions stored in the control computation apparatus 62. With the number of the stored system variables thus changed, the control computation apparatus 62 informs the adjuster $5K_1$ of that change. At this point, the adjuster $5K_1$ adjusts, using the system variable $x_i$, the gains of all stored control functions in the control computation apparatus 62. The control computation apparatus 62 computes the control function with its gain adjusted using the input system variable from the other module, and outputs a cooperative control signal $u_i$ accordingly. If a plurality of control functions exist, the control computation apparatus 62 computes on the control function corresponding to each of the input system variables, and outputs a cooperative control signal $u_1$ reflecting the result of the operation on each control function.

The embodiment of FIG. 36 is capable of automatically increasing or reducing the number of the control functions stored in the cooperative controller of each of the controller modules constituting the control system, the increasing or decreasing of the stored control functions being achieved depending on whether a new controller module to cover a new system target was combined to the control system, or the controller module controlling the system target was separated from the control system. With the new system configuration combining or separating a controller module(s) along with the system target(s) controlled thereby, the cooperative controller of the current module outputs a cooperative control signal based on the measured values of the system variable(s) corresponding to the system target (s) controlled by the other module(s).

For example, suppose that the controller module $2K_1$ operates on a stand-alone basis to let the independent controller $3K_1$ provide independent control on the system target 8K. Suppose that a controller module $2K_2$ is newly combined to the control system. 1K. The new controller module $2K_2$ controls an new system target $8K_1$. The controlled system targets 8K and $8K_1$ are arranged so that the changes in their system variables interfere with each other. In that case, the control function generation apparatus 61 detects the presence of a new system variable $x_j$, generates a new control function $f_{ij}(x_j)$ corresponding to that variable, and stores the control function $f_{ij}(x_j)$ in the control computation apparatus 62. When informed of the change in the number of the stored control functions, the adjuster $5K_1$ adjusts the gain of the system variable $f_{ij}(x_j)$ based on the system variable $x_i$. The control computation apparatus 62 computes on the control function $f_{ij}(x_j)$ with its gain adjusted according to the system variable $x_j$ and the reference value $r_2$ for the independent controller of the controller module $2K_2$. After the computation, the control computation apparatus 62 outputs a cooperative control signal $u_i$. The synthesizer $6K_1$ corrects the independent control signal $u_{ii}$ output by the independent controller $3K_1$ by using the cooperative control signal $u_i$, and generates a control signal $U_i$. The system target 8K is controlled on the basis of the control signal $U_i$.

Suppose that the controller module $2K_2$ was from the control system 1K having the controller modules $2K_1$ and that the system targets 8K and $8K_1$ are dissociated from each other so that their changing system variables will not interfere. In that case, the control function deletion apparatus 60 of the cooperative controller $4K_1$ deletes the control function $f_{ij}(x_j)$ from within the control computation apparatus 62. Since the control computation apparatus 62 contains only the control function $f_{ij}(x_j)$, the control computation apparatus 62 does not output the cooperative control signal $u_i$. This allows the controller module $2K_1$ to enter easily into a state of stand-alone operation based on the output of the independent controller $3K_1$.

As described, the embodiment of FIG. 36 makes it easy to connect and disconnect the system targets under control and the controller modules controlling these system targets to and from the control system configured. When a new control system is configured, the number of the control functions stored in a cooperative controller is readily changed accordingly, and cooperative control is effected over the system target with the changed number of the control functions taken into consideration.

The control system 1K of the above-described embodiment thus provides the same effects and benefits as the embodiment of FIG. 1.

An alternative to the above embodiment is to remove the communication message interpreting means from the control function generation apparatus 61 and tha control function deletion apparatus 60 and to establish that means independently in the cooperative controller $4K_1$. In that case, the output of the communication message interpreting means is transmitted to the control function generating apparatus and to the control function deletion apparatus.

Figure 37:
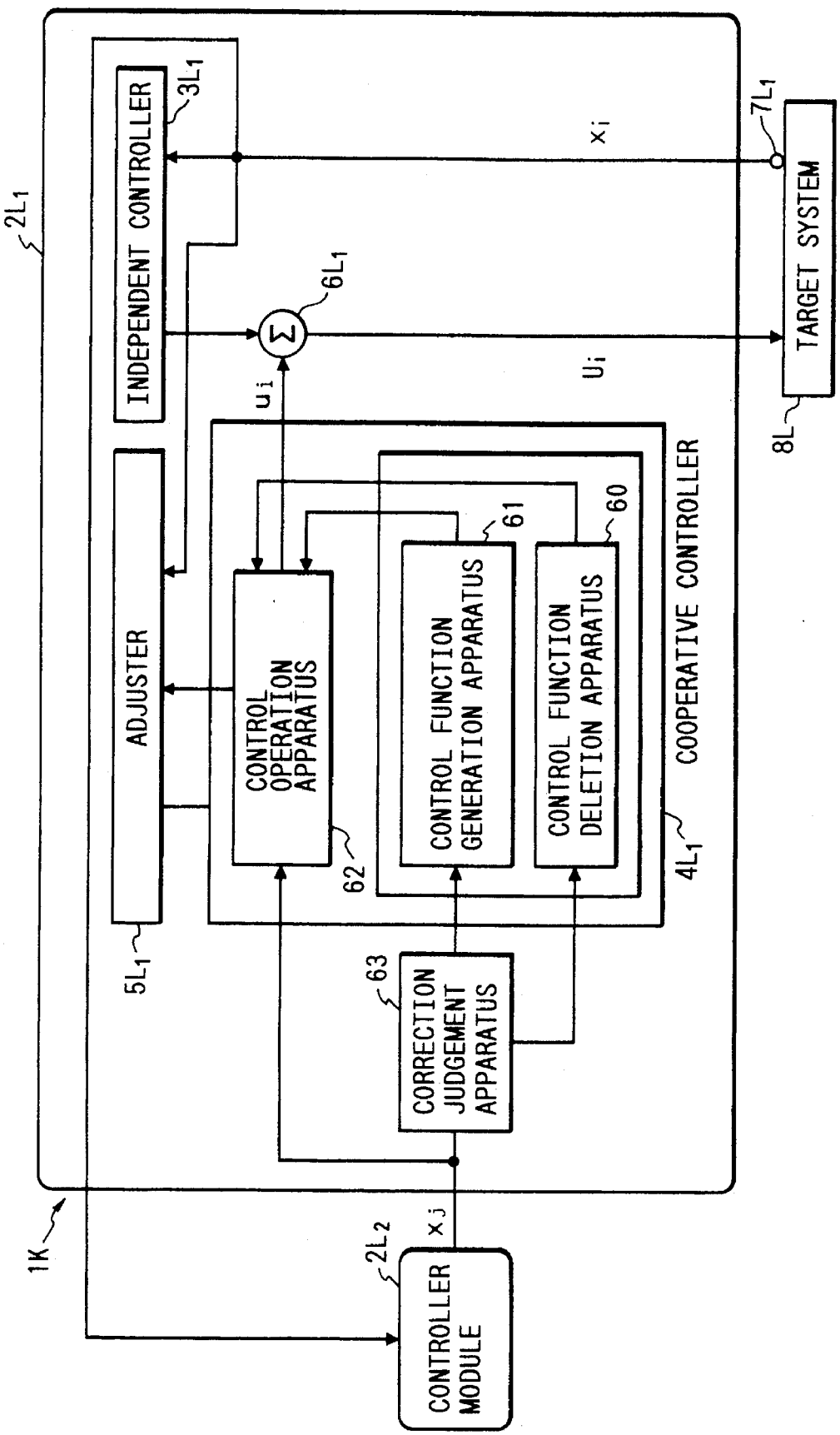
FIG. 37 is a block diagram of a further control system embodying the invention.

Another control system 1L embodying the invention is described with reference to FIG. 37. The control system 1L comprises controller modules $2L_1$ and $2L_2$ that are functionally equivalent to each other while controlling different system targets.

The controller modules of the control system 1L are identical in terms of their constitution, which is described using the controller module $2L_1$ as an example. The controller module $2L_1$ comprises a independent controller $3L_1$, a cooperative controller $4L_1$, an adjuster $5L_1$ and a synthesizer $6L_1$. Except for the cooperative controller, the component units of the controller module 2L are functionally equivalent to their counterparts of the controller module 2 in FIG. 1. The synthesizer $6L_1$ combines the output signal of the independent controller $3L_1$ with that of the cooperative controller $4L_1$ to output a control signal $U_i$, which is used to control an system target 8L. Reference numeral $7L_1$ denotes a sensor.

The cooperative controller $4L_1$ of this embodiment is a variation of the cooperative controller $4K_1$ in FIG. 36 supplemented by correlation judging apparatus 63 and ridding the control function generation apparatus 61 and control function deletion apparatus 60 of the communication message interpreting means. The correlation judging apparatus 63 checks for a correlation between the system variable $x_i$ of the current module and the system variable $x_j$ of another module. If a correlation is found to exist between the two system variables, the correlation judging apparatus 63 causes the control function generating apparatus 61 to act; if no such correlation is found, the correlation judging apparatus 63 activates the control function deletion apparatus 60. That is, depending on the status of correlation, a control function is added to or deleted from the control computation apparatus 62 by the control function generation apparatus 61 or by the control function deletion apparatus 60, respectively.

The control system 1L of the above-described embodiment thus provides the same effects and benefits as the embodiment of FIG. 36.

Another control system 1M embodying the invention is described with reference to FIG. 38. This embodiment is a variation of the embodiment of FIG. 1 with the controller modules 2 and 2A supplemented by controllers $64M_1$ and $64M_2$ having independent controllers for backup purposes. The control system 1M comprises controller modules $2M_1$ and $2M_2$. The controller module $2M_1$ has a independent controller $3M_1$, an adjuster $5M_1$, a synthesizer $6M_1$, a cooperative controller $64M_1$, a switching controller 66A and a switching controller $67M_1$. The controller modules $2M_2$ includes a independent controller $3M_2$, an adjuster $5M_2$, a synthesizer $6M_2$, a cooperative controller $64M_2$, a switching controller 66B and a switching controller $67M_2$. The controller modules $2M_1$ and $2M_2$ are functionally equivalent to each other.

The cooperative controller $64M_1$ has a cooperative controller $4M_1$ and a independent controller $65M_1$ for backup purposes. The cooperative controller $4M_1$ functions in the same way as the cooperative controller 4 of the embodiment in FIG. 1. The independent controller $65M_1$ acts as a backup unit to take over the independent controller $3M_1$ in case the latter fails. The switching controller $67M_1$ is generally connected to the synthesizer $6M_1$. The switching controller $67M_1$ receives the output of the independent controller $6M_1$ to see if the latter has failed. If the independent controller 6M₁ is found to have failed, the switching controller 67M₁ connects the switching controller 67M₁ to the independent controller 65M₁. This action terminates control of the cooperative controller 4M₁. When the independent controller 6M₁ has failed, the system target 8 is controlled by the independent controller 65M₁ alone.

Figure 38:
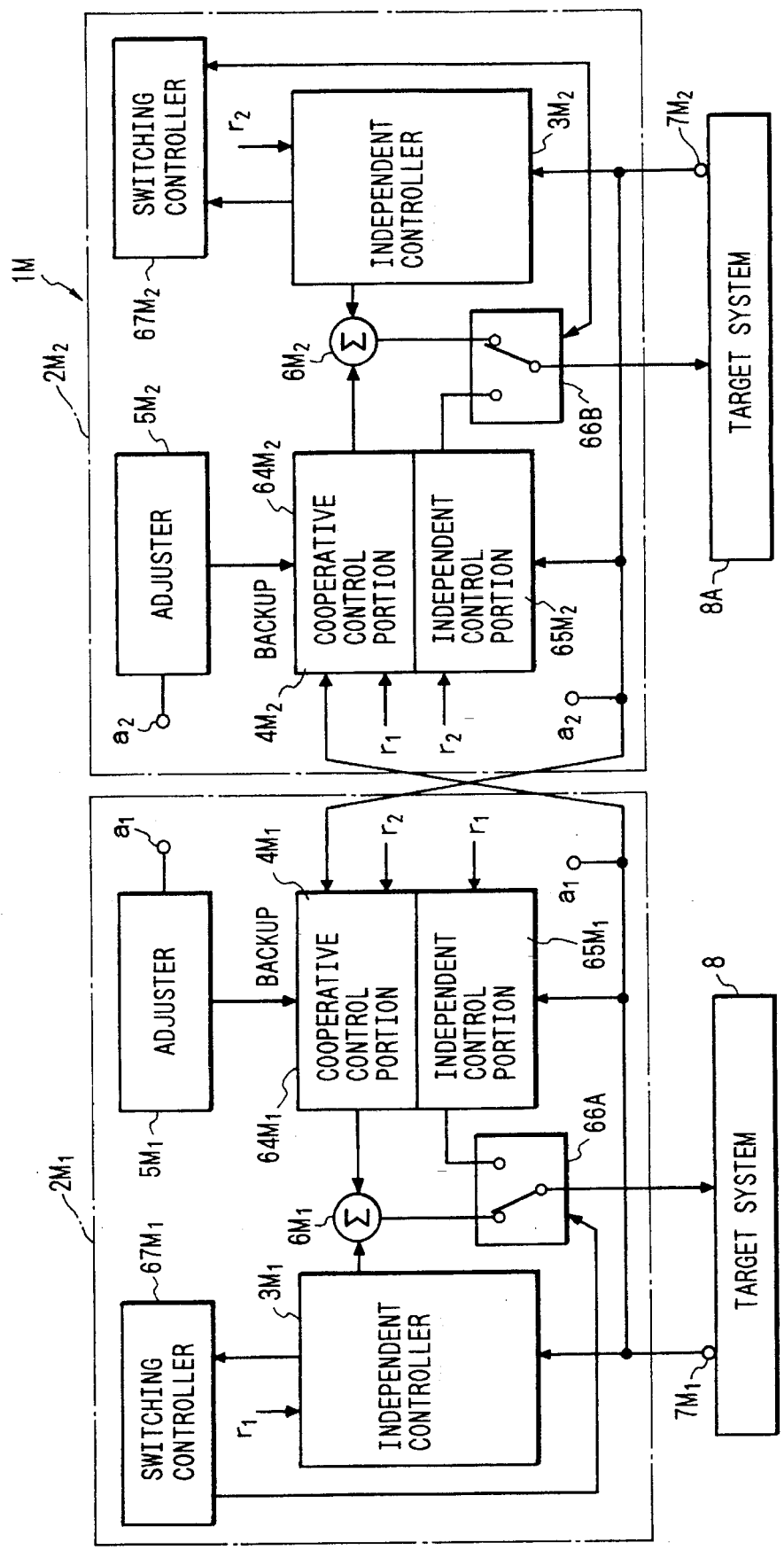
FIG. 38 is a block diagram of an even further control system embodying the invention.

As described, the embodiment of FIG. 38 lets the independent controller 65M₁ take over the function of the independent controller 6M₁ in case the latter fails. This embodiment thus provides the same effects and benefits as the embodiment of FIG. 1.

Figure 39:
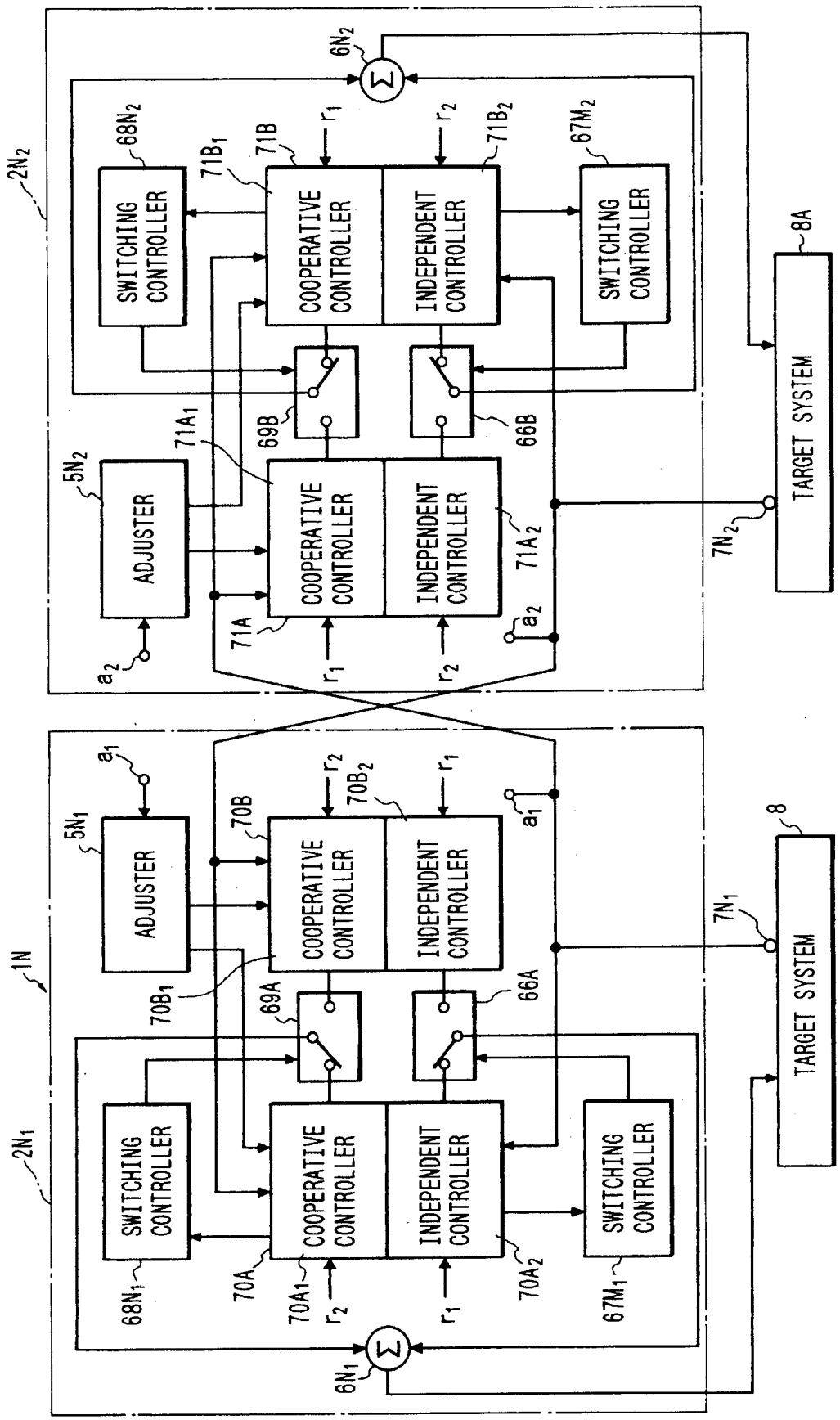
FIG. 39 is a block diagram of a still further control system embodying the invention.

Another control system 1N embodying the invention is described with reference to FIG. 39. This embodiment is a variation of the embodiment of FIG. 38 in which each controller module has backup functions to take over the independent and cooperative control functions of that module.

The control system 1N comprises controller modules 2N₁ and 2N₂. The controller module 2N₁ has controllers 70A and 70B, an adjuster 5N₁, a synthesizer 6N₁, switching controllers 66A and 69A, and switching controllers 67M₁ and 68N₁. The controller 70A includes a independent controller 70A₂ and a cooperative controller 70A₁. The controller 70B possesses a independent controller 70B₂ and a cooperative controller 70B₁. The controller module 2N₂ has controllers 71A and 71B, an adjuster 5N₂, a synthesizer 6N₂, switching devices 66B and 69B, and switching controllers 67M₂ and 68N₂. The controller 71A includes a independent controller 71A₂ and a cooperative controller 71A₁. The controller 71B possesses a independent controller 71B₂ and a cooperative controller 71B₁. The controllers 70B and 71B act as backup controllers.

The controller modules 2N₁ and 2N₂ have the same functions. These functions is described using the controller module 2N₁ as an example.

Generally, the cooperative controller 70A₁ in the controller 70A is connected to the synthesizer 6N₁ via the switching device 69A, while the independent controller 70A₁ in the same controller 70A is connected to the synthesizer 6N₁ via the switching device 66A. If the switching controller 68N₁ detects a failure of the cooperative controller 70A₁, the switching controller 68N₁ causes the switching device 69A to connect the backup cooperative controller 70B₁ to the synthesizer 6N₁. If the switching controller 68M₁ detects a failure of the independent controller 70A₂, the switching controller 68M₁ causes the switching device 66A to connect the backup independent controller 70B₂ to the synthesizer 6N₁. The adjuster 5N₁ is capable of adjusting the gains of the cooperative controller 70A₁ and 70B₁.

As described, the embodiment of FIG. 39 allows the backup cooperative controller 70B₁ and the backup independent controller 70B₂ to take over the cooperative controller 70A₁ and the independent controller 70A₂, respectively, in case of a failure of the later. This embodiment thus provides the same effects and benefits as the embodiment of FIG. 1.

What is claimed is:

1. A control system having independent and cooperative control functions, comprising a plurality of controller modules, each of said controller modules including an independent controller, a cooperative controller, and a control signal generation apparatus, wherein the independent controller of one controller module outputs a first control signal based on measured values of a first system variable varied by controlling a first target system based on third control signals from the control signal generation apparatus of the one controller module, the cooperative controller of the one controller module outputs a second control signal based on measured values of a second system variable varied by controlling a second target system based on third control signals from the control signal generation apparatus of another controller module, and the control signal generation apparatus of the one controller module outputs the third control signals for controlling the first target system based on the first control signal and the second control signal in the one controller module.

2. A control system having independent and cooperative control functions to claim 1, wherein said control signal generation apparatus outputs the third control signals generated by correcting the first control signal based on the second control signal.

3. A control system having independent and cooperative control functions according to claim 2, wherein each of said controller modules comprises an adjusting apparatus for adjusting the gain of said cooperative controller based on the measured values of the first system variable.

4. A control system having independent and cooperative control functions according to claim 3, wherein said adjusting apparatus includes gain generating means for generating the adjusted gain, and judging means for judging an improvement derived from said adjusted gain in the control response of the controlled first target system based on the measured values of the first system variable.

5. A control system having independent and cooperative control functions according to claim 3, wherein said adjusting apparatus includes gain generating means for generating the adjusted gain, and judging means for judging an improvement derived from said adjusted gain in the control response of the controlled first target system based on the measured values of the first and the second system variable.

6. A control system having independent and cooperative control functions according to claim 3, wherein said cooperative controller includes computation means for generating the output of said cooperative controller using a control functions based on the measured values of the second system variable, and control function varying means for adding and deleting said control function within said computation means based on the measured values of the second system variable.

7. A control system having independent and cooperative control functions according to claim 6, wherein said control function varying means includes control function removing means for removing said control function from said computation means when the measured values of the second system variable have stopped coming in, and control function storing means for generating a control function regarding the second target system and storing the generated control function into said computation means when the measured values of the controlled target system are input repeatedly.

8. A control system having independent and cooperative control functions according to claim 3, wherein said cooperative controller includes computation means for generating the output of said cooperative controller using a control function based on the measured values of the second system variable; control function varying means for adding and deleting said control functions based on the measured values of the second system variable; and added control function supporting means for causing said control function varying means to support a added control function when the correlation coefficient between the first system variable and the second system variable is greater than a predetermined value.

9. A control system having independent and cooperative control functions according to claim 8, wherein said adjusting apparatus includes gain adjusting means for adjusting the gain of all control functions within said computation means when said computation means notifies said adjusting apparatus of a control function being varied.

10. A control system having independent and cooperative control functions according to claim 1, wherein said control signal generation apparatus is means for synthesizing the first control signal and the second control signal.

11. A control system having independent and cooperative control functions according to claim 10, wherein each of said controller modules comprises an adjusting apparatus for adjusting the gain of said cooperative controller based on the measured values of the first system variable.

12. A control system halving independent and cooperative control functions according to claim 1, wherein each of said controller modules comprises an adjusting apparatus for adjusting the gain of said cooperative controller based on the measured values of the first system variable.

13. A control system having independent and cooperative control functions according to claim 1, wherein the measured values of the first system are communicated to said another controller module.

14. A control system having independent and cooperative control functions according to claim 1, wherein said cooperative controller includes computation means for generating the output of said cooperative controller using a control function based on the measured values of the second system variable, and control functions varying means for adding and deleting said control functions within said computation means on the basis of the measured values of the second system variable.

15. A control system having independent and cooperative control functions according to claim 14, wherein said control function varying means includes control function removing means for removing said control function from said computation means when the measured values of the second system variable have stopped coming in, and control function storing means for generating a control function regarding an second target system and storing the generated control function into said computation means when the measured values of the second system variable are input repeatedly.

16. A control system having independent and cooperative control functions according to claim 1, wherein said cooperative controller includes computation means for generating the output of said cooperative controller using a control function based on the measured values of the second system variable; control function varying means for adding and deleting said control functions within said computation means based on the measured values of the second system variable; and added control function supporting means for causing said control function varying means to support a add control function when the correlation coefficient between the first system variable and the second system variable is greater than a predetermined value.

17. A control system having independent and cooperative control functions, comprising a plurality of controller modules, each of said controller modules including an independent controller, a cooperative controller, and a control signal generation apparatus, the independent controller of one controller module outputs a first control signal obtained on the basis of measured values of a first system variable varied by controlling a first target system based on control signals from the control signal generation apparatus of the one controller module, the cooperative controller of the one controller module outputs a second control signal obtained on the basis of measured values of a second system variable varied by controlling a second target system based on control signals from the control signal generation apparatus of another controller module, and the control signal generation apparatus of the one controller module generates the control signals for controlling the first target system by correcting the first control signal in the one controller module and the second control signal in the one controller module.

18. A control system having independent and cooperative control functions according to claim 17, wherein each of said controller modules comprises an adjusting apparatus for adjusting the gain of said cooperative controller based on the measured values of the first system variable.

19. A control system having independent and cooperative control functions according to claim 18, wherein said adjusting apparatus includes gain generating means for generating the adjusted gain, and judging means for judging an improvement derived from said adjusted gain in the control response of the controlled first target system based on the measured values of the first system variable.

20. A control system having independent and cooperative control functions according to claim 18, wherein said adjusting apparatus includes gain generating means for generating the adjusted gain, and judging means for judging an improvement derived from said adjusted gain in the control response of the controlled first target system based on the measured values of the first and the second system variable.

21. A control system having independent and cooperative control functions according to claim 18, wherein said cooperative controller includes computation means for generating the output of said cooperative controller using a control functions based on the measured values of the second system variable, and control function varying means for adding and deleting said control function within said computation means based on the measured values of the second system variable.

22. A control system having independent and cooperative control functions according to claim 21, wherein said control function varying means includes control function removing means for removing said control function from said computation means when the measured values of the second system variable have stopped coming in, and control function storing means for generating a control function regarding the second target system and storing the generated control function into said computation means when the measured values of the controlled target system are input repeatedly.

23. A control system having independent and cooperative control functions according to claim 18, wherein said cooperative controller includes computation means for generating the output of said cooperative controller using a control function based on the measured values of the second system variable; control function varying means for adding and deleting said control functions based on the measured values of the second system variable; and added control function supporting means for causing said control function varying means to support a added control function when the correlation coefficient between the first system variable and the second system variable is greater than a predetermined value.

24. A control system having independent and cooperative control functions according to claim 23, wherein said adjusting apparatus includes gain adjusting means for adjusting the gain of all control functions within said computation means when said computation means notifies said adjusting apparatus of a control function being varied.

25. A control system having independent and cooperative control functions according to claim 17, wherein the measured values of the first system are communicated to said another controller module.

26. A control system having independent and cooperative control functions according to claim 17, wherein said cooperative controller includes computation means for generating the output of said cooperative controller using a control function based on the measured values of the second system variable, and control functions varying means for adding and deleting said control functions within said computation means on the basis of the measured values of the second system variable.

27. A control system having independent and cooperative control functions according to claim 26, wherein said control function varying means includes control function removing means for removing said control function from said computation means when the measured values of the second system variable have stopped coming in, and control function storing means for generating a control function regarding an second target system and storing the generated control function into said computation means when the measured values of the second system variable are input repeatedly.

28. A control system having independent and cooperative control functions according to claim 17, wherein said cooperative controller includes computation means for generating the output of said cooperative controller using a control function based on the measured values of the second system variable; control function varying means for adding and deleting said control functions within said computation means based on the measured values of the second system variable; and added control function supporting means for causing said control function varying means to support a add control function when the correlation coefficient between the first system variable and the second system variable is greater than a predetermined value.

29. A control system having independent and cooperative control functions, comprising a plurality of controller modules, each of said controller modules including an independent controller, a cooperative controller, and a control signal generation apparatus, the independent controller of one controller module outputs a first control signal based on a first reference value of the one controller module and measured values of a first system variable varied by controlling a first target system based on third control signals from the control signal generation apparatus of the one controller module, the cooperative controller of the one controller module outputs a second control signal based on a first reference value of the another controller module and measured values of a second system variable varied by controlling a second target system based on third control signals from the control signal generation apparatus of another controller module, and the control signal generation apparatus of the one controller module outputs the third control signals for controlling the first target system based on the first control signal and the second control signal in the one controller module.

30. A control system having independent and cooperative control functions according to claim 29, wherein said control signal generation apparatus outputs the third control signals generated by correcting the first control signal based on the second control signal.

31. A control system having independent and cooperative control functions according to claim 30, wherein each of said controller modules comprises an adjusting apparatus for adjusting the gain of said cooperative controller based on the measured values of the first system variable.

32. A control system having independent and cooperative control functions according to claim 29, wherein said control signal generation apparatus is means for synthesizing the first control signal and the second control signal.

33. A control system having independent and cooperative control functions according to claim 32, wherein each of said controller modules comprises an adjusting apparatus for adjusting the gain of said cooperative controller based on the measured values of the first system variable.

34. A control system having independent and cooperative control functions according to claim 29, wherein each of said controller modules comprises an adjusting apparatus for adjusting the gain of said cooperative controller based on the measured values of the first system variable.

35. A control system having independent and cooperative control functions according to claim 34, wherein said adjusting apparatus includes gain generating means for generating the adjusted gain, and judging means for judging an improvement derived from said adjusted gain in the control response of the controlled first target system based on the measured values of the first system variable.

36. A control system having independent and cooperative control functions according to claim 29, wherein the measured values of the first system are communicated to said another controller module.

37. A control system having independent and cooperative control functions according to claim 29, wherein said cooperative controller includes computation means for generating the output of said cooperative controller using a control function based on the measured values of the second system variable, and control functions varying means for adding a d deleting said control functions within said computation means on the basis of the measured values of the second system variable.

38. A control system having independent and cooperative control functions according to claim 37, wherein said control function varying means includes control function removing means for removing said control function from said computation means when the measured values of the second system variable have stopped coming in, and control function storing means for generating a control function regarding an second target system and storing the generated control function into said computation means when the measured values of the second system variable are input repeatedly.

39. A control system having independent and cooperative control functions according to claim 29, wherein said cooperative controller includes computation means for generating the output of said cooperative controller using a control function based on the measured values of the second system variable; a control function varying means for adding and deleting said control functions within said computation means based on the measured values of the second system variable; and added control function supporting means for causing said control function varying means to support a add control function when the correlation coefficient between the first system variable and the second system variable is greater than a predetermined value.

40. A control system having independent and cooperative control functions according to claim 15, wherein said adjusting apparatus includes gain adjusting means for adjusting the gain of all control functions within said computation means when said computation means notifies said adjusting apparatus of a control function being varied.

41. A control system having independent and cooperative control functions for use in a plant comprising a plurality of tanks and a plurality of liquid supply apparatus furnishing said tanks with liquid flow rate adjusting means, said tanks being connected by conduits equipped with valves and having a liquid outlet port each;

said control system comprising a plurality of controller modules assigned respectively to said liquid flow rate adjusting means, each of said controller modules including an independent controller, a cooperative controller, and a control signal generation apparatus;

the independent controller of one controller module outputs a first control signal based on measured values of a first liquid level varied by controlling a first liquid flow rate adjusting means based on third control signals from the control signal generation apparatus of the one controller module, the cooperative controller of the one controller module outputs a second control signal based on measured values of a second liquid level varied by controlling a second liquid flow rate adjusting means based on third control signals from the control signal generation apparatus of another controller module, the control signal generation apparatus of the one controller module outputs the third control signals for controlling the first liquid flow rate adjusting means based on the first control signal and the second control signal in the one controller module.

42. A control system having independent and cooperative control functions for use in a nuclear power plant comprising steam piping for guiding steam generated in a nuclear reactor to a turbine, a control valve provided to said steam piping, and a coolant supply apparatus for supplying the coolant into reactor core in the nuclear reactor;

said control system comprising a coolant supply flow rate controller for controlling said coolant supply apparatus so as to adjust a flow rate of the coolant supplied into the reactor core, and a pressure controller for controlling the control valve so as to adjust the pressure in the nuclear reactor;

said coolant supply flow rate controller including a first independent controller, a first cooperative controller, and a first control signal generation apparatus;

said pressure controller including a second independent controller, a second cooperative controller, and a second control signal generation apparatus;

the first independent controller outputs a first control signal based on measured values of the flow rate of the coolant varied by controlling the coolant supply apparatus based on third control signals from the first control signal generation apparatus, the first cooperative controller outputs a second control signal based on measured values of pressure of the steam varied by controlling the control valve based on sixth control signals from the second control signal generation apparatus, the first control signal generation apparatus outputs the third control signals for controlling the coolant supply apparatus based on the first control signal and the second control signal, the second independent controller output a fourth control signal based on measured values of the pressure of the steam varied by controlling the control valve based on the sixth control signals from the second control signal generation apparatus, the first cooperative controller outputs a fifth control signal based on measured values of the flow rate of the coolant varied by controlling the coolant supply apparatus based on the third control signals from the first control signal generation apparatus, the second control signal generation apparatus outputs the sixth control signals for controlling the coolant supply apparatus based on the fourth control signal and the fifth control signal.

43. A control system having independent and cooperative control functions for use with a plurality of air conditioners, each provided with a compressor, said control system comprising a plurality of controller modules, each of said controller modules including an independent controller, a cooperative controller, and a control signal generation apparatus, wherein the independent controller of one controller module outputs a first control signal based on measured values of a first room temperature varied by controlling a first compressor based on third control signals from the control signal generation apparatus of the one controller module, the cooperative controller of the one controller module outputs a second control signal based on measured values of a second room temperature varied by controlling a second compressor based on third control signals from the control signal generation apparatus of another controller module, and the control signal generation apparatus of the one controller module outputs the third control signals for controlling the first compressor based on the first control signal and the second control signal in the one controller module.

44. A control system having independent and cooperative control functions for use with a plurality of acoustic apparatuses each provided with an amplifier, said control system comprising a plurality of controller modules, each of said controller modules including an independent controller, a cooperative controller, and a control signal generation apparatus, wherein the independent controller of one controller module outputs a first control signal based on measured values of a first sound field varied by controlling a first amplifier based on third control signals from the control signal generation apparatus of the one controller module, the cooperative controller of the one controller module outputs a second control signal based on measured values of a second sound field varied by controlling a second amplifier based on third control signals from the control signal generation apparatus of another controller module, the control signal generation apparatus of the one controller module outputs the third control signals for controlling the first amplifier based on the first control signal and the second control signal in the one controller module.

45. A control system having independent and cooperative control functions for use with a plurality of illumination apparatuses each having illumination output adjusting means, said control system comprising a plurality of controller modules, each of said controller modules including an independent controller, a cooperative controller, and third control signal generation apparatus, the independent controller of one controller module outputs a first control signal based on measured values of first illumination intensity varied by controlling first illumination output adjusting means based on third control signals from the control signal generation apparatus of the one controller module, the cooperative controller of the one controller module outputs a second control signal based on measured values of second illumination intensity varied by controlling second illumination output adjusting means based on third control signals from the control signal generation apparatus of another controller module, the control signal generation apparatus of the one controller module outputs the third control signals for controlling the first illumination output adjusting means based on the first control signal and the second control signal in the one controller module.

* * * * *